(12) United States Patent
de Almeida Barreto et al.

(10) Patent No.: US 12,236,547 B2
(45) Date of Patent: Feb. 25, 2025

(54) SYSTEMS AND METHODS FOR 3D REGISTRATION OF CURVES AND SURFACES USING LOCAL DIFFERENTIAL INFORMATION

(71) Applicant: Smith & Nephew, Inc., Memphis, TN (US)

(72) Inventors: João Pedro de Almeida Barreto, Coimbra (PT); Carolina dos Santos Raposo, Coimbra (PT)

(73) Assignee: SMITH & NEPHEW, INC., Memphis, TN (US)

(*) Notice: Subject to any disclaimer, the term of this patent is extended or adjusted under 35 U.S.C. 154(b) by 0 days.

(21) Appl. No.: 17/735,592

(22) Filed: May 3, 2022

(65) Prior Publication Data

US 2022/0406025 A1    Dec. 22, 2022

Related U.S. Application Data

(63) Continuation of application No. 17/020,043, filed on Sep. 14, 2020, now Pat. No. 11,335,075, which is a
(Continued)

(51) Int. Cl.
*G06T 19/20* (2011.01)
*G06T 7/00* (2017.01)
(Continued)

(52) U.S. Cl.
CPC ............ *G06T 19/20* (2013.01); *G06T 7/0012* (2013.01); *G06T 7/344* (2017.01); *G06V 10/764* (2022.01);
(Continued)

(58) Field of Classification Search
None
See application file for complete search history.

(56) References Cited

U.S. PATENT DOCUMENTS

| 5,313,306 A | 5/1994 | Kuban et al. |
| 5,767,980 A | 6/1998 | Wang et al. |
| (Continued) | | |

FOREIGN PATENT DOCUMENTS

| EP | 1759629 A1 | 3/2007 |
| EP | 2153794 A2 | 2/2010 |
| (Continued) | | |

OTHER PUBLICATIONS

Tang, Son-Lik, et al. "Augmented reality systems for medical applications." IEEE engineering in medicine and biology magazine 17.3 (1998): 49-58. (Year: 1998).*

(Continued)

*Primary Examiner* — Sarah Le
(74) *Attorney, Agent, or Firm* — Dickinson Wright PLLC

(57) ABSTRACT

Systems and methods are provided for accomplishing fast and accurate 3D registration of curves and surfaces using local differential information, i.e., normals and tangents. In an embodiment, a method solves the curve-vs-surface alignment problem either by using a purely online search scheme, or by taking advantage of the availability of a pre-operative model, which often happens in medical procedures, to further speed-up the computational search by performing offline processing of the pre-operative bone model. The disclosed method is also extended to solve the curve-vs-curve and surface-vs-surface alignment problems, which also have important applications in medical procedures such as arthroscopy and arthroplasty.

21 Claims, 17 Drawing Sheets

Related U.S. Application Data continuation of application No. 16/492,760, filed as application No. PCT/US2018/022512 on Mar. 14, 2018, now Pat. No. 10,796,499.

(60) Provisional application No. 62/471,339, filed on Mar. 14, 2017.

(51) Int. Cl.
  *G06T 7/33* (2017.01)
  *G06V 10/764* (2022.01)
  *G06V 20/64* (2022.01)

(52) U.S. Cl.
  CPC .. *G06V 20/653* (2022.01); *G06T 2207/10024* (2013.01); *G06T 2207/10028* (2013.01); *G06T 2207/10081* (2013.01); *G06T 2207/10088* (2013.01); *G06T 2207/30008* (2013.01)

(56) References Cited

U.S. PATENT DOCUMENTS

| | | | |
|---|---|---|---|
| 5,836,869 A | 11/1998 | Kudo et al. | |
| 6,047,088 A | 4/2000 | van Beek et al. | |
| 6,072,496 A | 6/2000 | Guenter et al. | |
| 6,449,103 B1 | 9/2002 | Charles | |
| 7,429,999 B2 | 9/2008 | Poulin | |
| 7,750,969 B2 | 7/2010 | Sato | |
| 7,751,865 B2 | 7/2010 | Jascob | |
| 7,808,525 B2 | 10/2010 | Katayama | |
| 7,892,165 B2 | 2/2011 | Nakamura | |
| 7,970,174 B2 | 6/2011 | Goldbach | |
| 8,223,193 B2 | 7/2012 | Zhao | |
| 8,771,177 B2 | 7/2014 | Hale et al. | |
| 8,902,232 B2 | 12/2014 | Debevec et al. | |
| 9,307,892 B2 | 4/2016 | Dahmen | |
| 9,367,928 B2 | 6/2016 | Barreto et al. | |
| 9,398,840 B2 | 7/2016 | Rehe | |
| 9,438,897 B2 | 9/2016 | Barreto et al. | |
| 9,547,940 B1* | 1/2017 | Sun | G06T 7/344 |
| 9,888,831 B2 | 2/2018 | Yoshino | |
| 9,986,183 B2 | 5/2018 | Baek et al. | |
| 10,499,996 B2 | 12/2019 | de Almeida Barreto | |
| 10,504,239 B2 | 12/2019 | Rodrigues et al. | |
| 10,796,499 B2 | 10/2020 | Barreto et al. | |
| 2004/0019274 A1 | 1/2004 | Galloway, Jr. et al. | |
| 2004/0070565 A1 | 4/2004 | Nayer et al. | |
| 2004/0181149 A1 | 9/2004 | Langlotz et al. | |
| 2005/0047676 A1 | 3/2005 | Kang et al. | |
| 2005/0085720 A1 | 4/2005 | Jascob | |
| 2005/0089199 A1 | 4/2005 | Marschner et al. | |
| 2005/0096515 A1 | 5/2005 | Geng | |
| 2005/0270375 A1 | 12/2005 | Poulin | |
| 2005/0280709 A1 | 12/2005 | Katayama | |
| 2005/0281465 A1 | 12/2005 | Marquart et al. | |
| 2006/0067573 A1 | 3/2006 | Parr et al. | |
| 2006/0239345 A1 | 10/2006 | Taubman et al. | |
| 2008/0075324 A1 | 3/2008 | Sato | |
| 2008/0097156 A1 | 4/2008 | Nakamura | |
| 2008/0202509 A1 | 8/2008 | Dillon et al. | |
| 2009/0010507 A1* | 1/2009 | Geng | G06T 7/593 |
| | | | 382/128 |
| 2010/0039506 A1 | 2/2010 | Sarvestani et al. | |
| 2010/0245541 A1 | 9/2010 | Zhao | |
| 2011/0075922 A1 | 3/2011 | Turner et al. | |
| 2011/0115798 A1 | 5/2011 | Nayar et al. | |
| 2011/0130761 A1 | 6/2011 | Plaskos et al. | |
| 2012/0078049 A1 | 3/2012 | Pauli et al. | |
| 2012/0120255 A1 | 5/2012 | Cao et al. | |
| 2013/0034203 A1 | 2/2013 | Wang et al. | |
| 2013/0123801 A1 | 5/2013 | Umasuthan et al. | |
| 2013/0150863 A1 | 6/2013 | Baumgartner | |
| 2013/0281821 A1 | 10/2013 | Liu et al. | |
| 2014/0022248 A1 | 1/2014 | Kuffner, Jr. et al. | |
| 2014/0031668 A1 | 1/2014 | Mobasser et al. | |
| 2014/0035893 A1 | 2/2014 | Jackson et al. | |
| 2014/0236159 A1 | 8/2014 | Haider et al. | |
| 2014/0285676 A1 | 9/2014 | Barreto et al. | |
| 2014/0327796 A1 | 11/2014 | Lin et al. | |
| 2015/0065799 A1 | 3/2015 | Hale et al. | |
| 2015/0254872 A1 | 9/2015 | Barreto et al. | |
| 2015/0297177 A1 | 10/2015 | Boctor et al. | |
| 2016/0000515 A1* | 1/2016 | Sela | A61B 34/10 |
| | | | 600/424 |
| 2016/0000518 A1 | 1/2016 | Thoranaghatte | |
| 2016/0148435 A1 | 5/2016 | Li et al. | |
| 2016/0161602 A1 | 6/2016 | Prokhorov | |
| 2016/0183841 A1 | 6/2016 | Duindam et al. | |
| 2016/0191887 A1 | 6/2016 | Casas | |
| 2016/0220099 A1 | 8/2016 | Schouwink et al. | |
| 2016/0306924 A1* | 10/2016 | Singh | G06F 16/51 |
| 2016/0324580 A1 | 11/2016 | Esterberg | |
| 2017/0258526 A1* | 9/2017 | Lang | A61F 2/32 |
| 2017/0325669 A1 | 11/2017 | Levy | |
| 2018/0049622 A1 | 2/2018 | Ryan et al. | |
| 2018/0071032 A1 | 3/2018 | Barreto | |
| 2018/0089855 A1 | 3/2018 | Rodrigues et al. | |
| 2019/0355183 A1 | 11/2019 | Xie et al. | |
| 2020/0074748 A1 | 3/2020 | Barreto et al. | |
| 2021/0134070 A1 | 5/2021 | Barreto et al. | |

FOREIGN PATENT DOCUMENTS

| | | | |
|---|---|---|---|
| EP | 3130276 A1 | 2/2017 | |
| WO | 2009042644 A2 | 4/2009 | |
| WO | 2013015699 A1 | 1/2013 | |
| WO | 2013052187 A2 | 4/2013 | |
| WO | 2014054958 A2 | 4/2014 | |
| WO | 2014122301 A1 | 8/2014 | |
| WO | WO-2016154557 A1 * | 9/2016 | A61B 34/10 |
| WO | 2016168307 A1 | 10/2016 | |
| WO | 2018170181 A1 | 9/2018 | |

OTHER PUBLICATIONS

Maier-Hein, Lena, et al. "Optical techniques for 3D surface reconstruction in computer-assisted laparoscopic surgery." Medical image analysis 17.8 (2013): 974-99 (Year: 2013).*

Kim, Dong Sik et al.; "Joint Optimization of Spatial Registration and Histogram Compensation for Microscopic Images"; Conference Proceedings: Annual International Conference of the IEEE Engineering in Medicine and Biology Society; pp. 3779-3782; Aug. 30, 2006.

Fitzgibbon, A.W.; "Simultaneous Linear Estimation of Multiple View Geometry and Lens Distortion;" Proceedings of the 2001 IEEE Computer Society Conference on Computer Vision and Pattern Recognition; CVPR 2001, vol. 1, pp. 1-8, Jan. 1, 2001.

Song, KS et al. "Region Adaptive Correction Method for Radial Distortion of Fish-Eye Image;" Image Processing: Algorithms and Systems X; And Parallel Processing For Imaging Applications II, SPIE, vol. 8295, No. 1., pp. 1-7, Feb. 9, 2012.

Kim, Seon Joo et al.; "Joint Feature Tracking and Radiometric Calibration from Auto-Exposure Video"; Computer Vision, 2007, pp. 1-8, Oct. 1, 2007.

Carr, Peter et al.; "Point-less Calibration: Camera Parameters from Gradient-Based Alignment to Edge Images"; Applications of Computer Vision (WACV), pp. 377-384, Jan. 9, 2012.

PCT International Search Report and Written Opinion issued in International Application No. PCT/PT2013/000057 mailed May 27, 2014.

Bruce D. Lucas and Takeo Kanade. An Iterative Image Registration Technique with an Application to Stereo Vision; In DARPA Image Understanding Workshop, pp. 121-130, Apr. 1981.

Simon Baker and Iain Matthews. Equivalence and Efficiency of Image Alignment Algorithms. In IEEE Conf. Vis. Patt. Recogn., vol. 1, pp. 1090-1097, Dec. 2001.

Simon Baker and Iain Matthews. Lucas-kanade 20 years on: A unifying framework'. Int. J. Comput. Vis.', 56(3):221-255, Mar. 2004.

(56) References Cited

OTHER PUBLICATIONS

Jianbo Shi and C. Tomasi. Good features to track. In IEEE Conf. Vis. Patt. Recogn., pp. 593 600, Jun. 1994.
Myung Hwangbo, Jun-Sik Kim, and Takeo Kanade. Gyro-aided feature tracking for a moving camera: fusion, auto-calibration and GPU implementation. Int. J. of Robot. Res., 30(14):1755-1774, Dec. 2011.
Jean-Yves Bouguet. Pyramidal Implementation of the Lucas Kanade Feature Tracker Description of the algorithm, 2000.
L. Matthews, T. Ishikawa, and S. Baker. The Template Update Problem. IEEE Trans. Patt. Anal. Mach. Intell., 26(6):810-815, Jun. 2004.
Reg G. Willson and Steven A. Shafer. What is the center of the image? J. Opt. Soc. Am. A, 11(11):2946-2955, Apr. 1993.
Joao P. Barreto. A Unifying Geometric Representation for Central Projection Systems. Comput. Vis. Imag. Unders., 103(3):208-217, Jun. 2006.
Joao P. Barreto, Jose Roquette, Peter Sturm, and Fernando Fonseca. Automatic Camera Calibration Applied to Medical Endoscopy. In Brit. Mach. Vis. Conf., Sep. 2009.
M. Menem, "Constraints on perspective images and circular panoramas," BMVC, Sep. 2004.
D. Claus and A. Fitzgibbon, "A Rational Function lens distortion model for general cameras," Computer Vision and Pattern Recognition IEEE Computer Society Conference on , pp. 213-219, vol. 1, Jun. 2005.
Bill Triggs, Philip F. McLauchlan, Richard I. Hartley, and Andrew W. Fitzgibbon. Bundle adjustment—a modern synthesis. In Proceedings of the International Workshop on Vision Algorithms: Theory and Practice, ICCV '99, pp. 298-372, London, UK, Springer-Verlag, 2000.
Greg Welch and Gary Bishop. An Introduction to the Kalman Filter. Technical report, University of North Carolina at Chapel Hill, Chapel Hill, N.C., USA, 1995; updated Jul. 2006.
Simon Baker, Daniel Scharstein, J. P. Lewis, Stefan Roth, Michael J. Black, and Richard Szeliski. A database and evaluation methodology for optical flow. Int. J. Comput. Vision, 92(1), Dec. 2011.
Steffen Gauglitz, Tobias Hollerer, and Matthew Turk. Evaluation of Interest Point Detectors and Feature Descriptors for Visual Tracking. Int. J. Comput. Vis., 94(3):335-360, Mar. 2011.
K. Daniilidis, A. Makadia, and T. Bulow. Image Processing in Catadiop-tric Planes: Spaciotemporal Derivatives and Optical Flow Computation. In Int. Workshop on Omndirectional Vision, Jun. 2002.
M. Lourenco, J. P. Barreto, and F. Vasconcelos. sRD-SIFT: Keypoint Detection and Matching in Images With Radial Distortion. IEEE Trans Robotics, Jun. 2012.
P. Sturm, S. Ramalingam, J.-P. Tardif, S. Gasparini and J. Barreto, Camera Models and Fundamental Concepts Used in Geometric Computer Vision. Now Publishers, Inc., Jan. 2011.
David Nistér. An Efficient Solution to the Five-Point Relative Pose Problem. IEEE Trans. Patt. Anal. Mach. Intell., Jun. 26, 2004.
R. Melo, J.P. Barreto, and G. Falcao. A new solution for camera calibration and real-time image distortion correction in medical endoscopy-initial technical evaluation. Biomedical Engineering, IEEE Transactions on, 59(3):634-644, Mar. 2012.
Alper Yilmaz, Omar Javed, and Mubarak Shah. Object Tracking: A survey. ACM Comput. Surv., 38, Dec. 2006.
Marc Pollefeys, Luc Van Gool, Maarten Vergauwen, Frank Verbiest, Kurt Cornelis, Jan Tops, and Reinhard Koch. Visual Modeling with a Hand-Held Camera. Int. J. Comput. Vis., 59(3):207-232, Sep. 2004.
P. Baker, C. Fermuller, Y. Aloimonos, and R. Pless. A Spherical Eye from Multiple Cameras (Makes Better Models of the World). In IEEE Conf. Vis. Patt. Recogn., Feb. 2001.
Peter Hansen, Peter Corke, and Wageeh Boles. Wide-Angle Visual Feature Matching for Outdoor Localization. Int. J. of Robot. Res., 29:267-297, Feb. 2010.
Darius Burschka, Ming Li, Russell H. Taylor, and Gregory D. Hager. Scale-Invariant Registration of Monocular Endoscopic Images to CT-Scans for Sinus Surgery. In Med. Image Comput. and Computer-Assist. Inter., Sep. 2004.
Alexander Behrens, Michael Bommes, Thomas Stehle, Sebastian Gross, Steffen Leonhardt, and Til Aach. Real-time Image composition of bladder mosaics in fluorescence endoscopy. Computer Science-Research and Development, 26:51-64, Feb. 2011.
Kevin Koeser, Bogumil Bartczak, and Reinhard Koch. Robust GPU-assisted camera tracking using free-form surface models. Journal of Real-Time Image Processing, 2(2):133-147, Oct. 2007.
T. Brox and J. Malik. Large displacement optical flow: descriptor matching in variational motion estimation. IEEE Trans. Patt. Anal. Mach. Intell., 33(3):500-513, Mar. 2011.
Miguel Lourenco and Joao P. Barreto. Tracking features in uncalibrated images with radial distortion. In Eur. Conf. Comput. Vis., pp. 1-14, Oct. 2012.
C. Mei, S. Benhimane, E. Malis, and P. Rives. Efficient Homography-based Tracking and 3D Reconstruction for Single Viewpoint Sensors. IEEE Trans Robotics, Dec. 2008.
A. Rav-Acha and S. Peleg. Lucas-Kanade without Iterative Warping. In IEEE Int. Conf. Image Process., pp. 1097-1100, Oct. 2006.
C. Mei, S. Benhimane, E. Malis, and P. Rives. Constrained multiple planar template tracking for central catadioptric cameras. In British Machine Vision Conference, Sep. 2006.
A. Salazar-Garibay, E. Malis, and C. Mei. Visual tracking of planes with an uncalibrated central catadioptric camera. In IROS, Mar. 2009.
Toru Tamaki, Tsuyoshi Yamamura, and Noboru Ohnishi. Unified approach to image distortion. In ICPR, pp. 584-587, Aug. 2002.
Y. Chang, "Multi-view 3D Reconstruction for Scenes Under the Refractive plane with known vertical direction," Computer Vision (ICCV), Nov. 2011.
T. Yamaguchi, M. Nakamoto, Y. Sato, Y. Nakajima, K. Konishi, M. Hashizume, T. Nishii, N. Sugano, H. Yoshikawa, K. Yonenobu, and S. Tamura, "Camera Model and Calibration Procedure for Oblique-Viewing Endoscope," in MICCAI, pp. 373-381, Nov. 2003.
C. Wu, B. Jaramaz, and S. G. Narasimhan, "A Full Geometric and Photometric Calibration Method for Oblique-viewing Endoscope," International Journal of Computer Aided Surgery, vol. 15, pp. 19-31, Apr. 2010.
N. Fukuda, Y. Chen, M. Nakamoto, and T, "A scope cylinder rotation tracking method for oblique-viewing endoscopes without attached sensing device," Software Engineering and Data Mining, No. 1, pp. 684-687, Jun. 2010.
J. Barreto, J. Santos, P. Menezes, and F. Fonseca, "Ray-based Calibration of Rigid Medical Endoscopes," in OMNIVIS, Sep. 2008.
B. Chapman, G. Jost, and R. Van Der Pass, Using OpenMP: Portable Shared Memory Parallel Programming (Scientific Computation and Engineering Series). The MIT Press, 2008.
M. A. Fischler and R. C. Bolles, "Random Sample Consensus: A Paradigm for Model Fitting with Applications to Image Analysis and Automated Cartography," Commun. ACM, vol. 24, No. 6, pp. 381-395, Jun. 1981.
A. Agrawal, Y. Taguchi, and S. Ramalingam, "Analytical forward projection for axial non-central diotropic and catadioptric cameras," presented at the ECCV'10: Proceedings of the 11th European Conference on Computer Vision: Part III, Sep. 2010.
W. Smith, N. Vakil, and S. Maislin, "Correction of Distortion in Endoscope Images," IEEE Transactions on Medical Imaging, vol. 11, No. 1, pp. 117-122, Mar. 1992.
Chen, X. et al., "A Theoretical Analysis of Camera Response Functions in Image Deblurring" European Conference on Computer Vision, 2012.
Fu, L. et al., "Camera Response Function Estimation and Application with a Single Image" Informatics in Control, Automation and Robotics, vol. 2, LNEE 133, pp. 149-156, 2011.
Hamey, L. "Simultaneous Estimation of Camera Response Function, Target Reflectance and Irradiance Values" Department of Computing, Macquarie University, Australia, Conference Dec. 6-8, 2005, Digital Image Computing: Techniques and Applications 2005.
Jalobeanu et al. "Modeling Images of Natural 30 Surfaces: Overview and Potential Applications"; IEEE; Publication [online]. Jun.

(56) References Cited

OTHER PUBLICATIONS

2004. [retrieved Jun. 24, 2016]. Retrieved from the Internet: <URL: http://citeseerx.ist.psu.edu/vlewdoc/download?doi=10.1.1.59.1141&rep=rep1&type=pdf>; pp. 1-9.

Li, X., et al., "Symmetry and Template Guided Completion of Damaged Skulls", Computers & Graphics, vol. 35, pp. 885-893, Jan. 31, 2011.

Lin, S. et al., "Radiometric Calibration from a Single Image" Proceedings of the 2004 IEEE Computer Society Conference on Computer Vision and Pattern Recognition, 2004.

Mitra, Niloy J., et al., "Registration of Point Cloud Data from a Geometric Optimization Perspective", Eurographics Symposium on Geometry Processing, pp. 23-32, 2004.

Ng, T. et al., "Using Geometry Invariants for Camera Response Function Estimation" IEEE Conference on Computer Vision and Pattern Recognition June 17-22, CVPR 2007.

Qiu, S. et al., "Estimation Method of CCD and CMOS Response Functions Based on a Single Image" International Conference on Optical Instruments and Technology: Optoelectronic Imaging and Process Technology, Proc. SPIE, 751325, Nov. 24, 2009.

Yu, W. "Practical Anti-Vignetting Methods for Digital Cameras" IEEE Transactions on Consumer Electronics, vol. 50, Issue 4, pp. 975-983, Nov. 2004.

Zheng, Y. et al., "Single-Image Vignetting Correction" IEEE Transactions on Pattern Analysis and Machine Intelligence, vol. 31, Issue 12, pp. 2243-2256, Oct. 31, 2008.

International Search Report and Written Opinion in International Application No. PCT/US2018/022512 mailed May 25, 2018.

Supplementary European Search Report based on EP 16769785 dated Oct. 26, 2018.

USPTO Office Action in U.S. Appl. No. 15/561,666 mailed Mar. 27, 2019.

USPTO Office Action in U.S. Appl. No. 15/566,536 mailed Apr. 4, 2019.

K. Vijayan-Asari, S. Kumar, and D. Radhakrishnan, "A new approach for nonlinear distortion correction in endoscopic mages based on least squares estimation," IEEE Transactions on Medical Imaging, vol. 18, No. 4, pp. 345-354, Apr. 1999.

J. Helferty, C. Zhang, G. McLennan, and W. Higgins, "Videoendoscopic distortion correction and its application to virtual guidance of endoscopy," IEEE Transactions on Medical Imaging, vol. 20, No. 7, pp. 605-617, Jul. 2001.

Kalman, R.E.; A New Approach to Linear Filtering and Prediction Problems; ASME—Journal of Basic Engineering, 82 (Series D): 35-45; Mar. 1960.

T. Stehle, M. Hennes, S. Gross, A. Behrens, J. Wulff, and T. Aach, "Dynamic Distortion Correction for Endoscopy Systems with Exchangeable Optics," in Bildverarbeitungfür die Medizin 2009. Berlin: Springer, pp. 142-146, 2009.

J.-Y. Bouguet. Camera Calibration Toolbox for Matlab. [Online]. Available: http://www.vision.caltech.edu/bouguetj/calibdoc/index.html#ref; Last Updated Oct. 14, 2015.

Z. Zhang, "Flexible camera calibration by viewing a plane from unknown orientations," in ICCV, pp. 666-673, Sep. 1999.

R. Shahidi, M. Bax, C. Maurer, J. Johnson, E. Wilkinson, B. Wang, J. West, M. Citardi, K. Manwaring, and R. Khadem, "Implementation, calibration and accuracy testing of an image-enhanced endoscopy system," IEEE Transactions on Medical Imaging, vol. 21, No. 12, pp. 1524-1535, Dec. 2002.

C. Wengert, M. Reef f, P. Cattin, and G. Sz'ekely, "Fully automatic endoscope calibration for intraoperative use," in Bildverarbeitungfür die Medizin 2006, pp. 419-423, Mar. 2006.

J. Mallon and P.F. Whelan, "Which pattern? Biasing aspects of planar calibration patterns and detection methods," Pattern Recognition Letters, vol. 28, No. 8, pp. 921-930, Jan. 2007.

S. D. Buck, F. Maes, A. D'Hoore, and p. Suetens, "Evaluation of a novel calibration technique for optically tracked oblique laparoscopes," Proceedings of the 10th international conference on Medical image computing and computer-assisted intervention—vol. Part I, pp. 467-474, Feb. 2007.

A. Fitzgibbon, M. Pilu, and R. Fisher, "Direct least square fitting of ellipses," IEEE Transactions on Pattern Analysis and Machine Intelligence, vol. 21, No. 5, pp. 476-480, May 1999.

Hartley, R. et al., "Parameter-free Radial Distortion Correction with Center of Distortion Estimation", IEEE Transactions on Pattern Analysis and Machine Intelligence, vol. 29, No. 8, pp. 1309-1321, 2007.

Zhang, Z., "A Flexible New Technique for Camera-Calibration", IEEE Transactions on Pattern Analysis and Machine Intelligence, vol. 22, No. 11, p. 1330-1334, 2000.

\* cited by examiner (b) $R_2 = e^{\lambda^{-1}[d']_\times \beta}$ (a) $R_1 = e^{[\omega]_\times \alpha}$ (a) No rotation to align  (b) There is a rotation that aligns

SYSTEMS AND METHODS FOR 3D REGISTRATION OF CURVES AND SURFACES USING LOCAL DIFFERENTIAL INFORMATION

RELATED APPLICATIONS

This application is a continuation patent application of U.S. application Ser. No. 17/020,043, filed Sep. 14, 2020, now U.S. Pat. No. 11,335,075, which is a continuation patent application of U.S. application Ser. No. 16/492,760, filed Sep. 10, 2019, now U.S. Pat. No. 10,796,499, which is a U.S. national phase application of PCT International Patent Application No. PCT/US2018/022512, filed on Mar. 14, 2018, which claims priority to and the benefit of U.S. Provisional Patent Application No. 62/471,339, filed Mar. 14, 2017, the entirety of each of which are hereby incorporated by reference for all purposes.

FIELD

The disclosure generally relates to the fields of computer vision and pattern recognition, and in particular, but not by way of limitation, the presented disclosed embodiments are used in Computer-Aided Orthopedic Surgery (CAOS) for the purpose of aligning 3D intra-operative data with a pre-operative 3D image of the relevant patient anatomy during arthroscopy and conventional open orthopedic surgery. One or more embodiments can also be employed in other clinical specialties, as well as in other application domains different from medicine, such as computer graphics or robotics, for the purpose of aligning or overlaying two distinct 3D data sets, models, or representations of the same or topologically equivalent 3D objects or surfaces.

BACKGROUND

The problem of 3D registration, in its most general sense, consists in finding the rigid transformation between two 3D models of the same object such that their overlapping areas match as well as possible. Any of the models can be a surface or dense point cloud, a sparse set of curves or contours, or a sparse set of isolated points or landmarks. 3D registration algorithms are of key importance in medical applications, either in the context of fusing multiple image modalities for diagnosis, or in the context of computer aided surgery where registration is used to overlay a pre-operative 3D image or plan with the actual patient's anatomy in the Operating Room (OR). There are still important limitations in terms of the types of 3D models that can be registered or aligned.

The present disclosure addresses this problem of practical significance in Computer-Aided Orthopedic Surgery (CAOS) that has applications both in arthroscopy and in conventional open procedures.

The methods herein disclosed can be used in particular, but not by way of limitation, in conjunction with the "Methods and Systems for Computer-Aided Surgery using Intra-Operative Video acquired by a Free-moving Camera" described in the international patent application PCT/US2016/024262. More specifically the methods and systems disclosed in PCT/US2016/024262 can be employed to obtain the input 3D intra-operative data, and the output registration results can be used in PCT/US2016/024262 for the purpose of guiding the surgeon during arthroscopy and conventional open surgery.

SUMMARY

Systems and methods are provided for accomplishing fast and accurate 3D registration of curves and surfaces using local differential information, i.e., normals and tangents.

An example embodiment of a method for registration of a 3D model M with a 3D model M' may include: (i) for model M', defining a plurality of 2-tuples, each 2-tuple in M' comprising a pair of points and a corresponding pair of vectors; (ii) for model M, selecting a 2-tuple comprising a pair of points and a corresponding pair of vectors; (iii) determining one or more respective 2-tuples in M' that correspond with the selected 2-tuple in M; (iv) for each 2-tuple in M' that corresponds with the selected 2-tuple in M, determining a rigid transformation that aligns or registers the two models M and M', where a rotation $R_i$ from M to M' is given by $$R_i = R_2 R_1,$$

where $R_1$ is a rotation that aligns a first vector that extends from the first point in the M' 2-tuple to the second point in the M' 2-tuple with a second vector that extends from the first point in the M 2-tuple to the second point in the M 2-tuple, and $R_2$ is a rotation that aligns the vectors in the M' 2-tuple with respective directions respectively defined by, or with respective planes respectively orthogonal to, the vectors in the M 2-tuple, and a translation t from M to M' is given by a difference between the first point in the M' 2-tuple and the product of $R_i$ and the first point in the M 2-tuple; (v) using a score function to evaluate how well each rigid transformation ti aligns model M with model M' and selecting the rigid transformation with the best score function value; and (iv) repeating steps (ii), (iii), (iv), and (v) until a value of a criterion exceeds a threshold.

An example embodiment of a method for the registration of a 3D model M of an object or environment, the 3D model M comprising one or more curves C, each curve C comprising a set of 3D points P that are represented in a local system of coordinates O and for which the unitary 3D vectors p tangent to C are known, with a 3D model M' of the object or environment, the 3D model M' comprising one or more surfaces S, each surface S comprising a set of 3D points P' that are represented in a local system of coordinates O' and for which the unitary 3D vectors p' normal to S are known, where registration comprises determining rotation R and translation t that transform coordinates in O into coordinates in O' such that model M becomes aligned with model M', may include: (i) for model M', defining a plurality of pairs of points P', Q' and corresponding vectors p', q', referred to as 2-tuples point+vector {P', Q', p', q'}, where each 2-tuple is defined by a 4-parameter descriptor $\Gamma$ given by:

$$\Gamma = [\lambda', \phi_{p'}, \phi_{q'}, \theta_{q'}]^T$$

with:

$$\lambda' = \|d'\|$$

$$\phi_{p'} = \frac{\pi}{2} - \cos^{-1}\left(\frac{p'^T d'}{\lambda'}\right),$$

$$\phi_{q'} = \frac{\pi}{2} - \cos^{-1}\left(\frac{q'^T d'}{\lambda'}\right),$$

$$\theta_{q'} = \text{sign}(p'^T(d' \times q')) \cdot \cos^{-1}\left(\frac{(q' \times d')^T(p' \times d')}{\|q' \times d'\|\|p' \times d'\|}\right),$$

where d'=P'−Q' and sign represents the signal function; (ii) for model M, selecting a 2-tuple point+vector {P, Q, p, q} and describing the selected 2-tuple by a 4-parameter descriptor F given by:

$$\Gamma=[\lambda,\phi_p,\phi_q,\theta_q]^T;$$

(iii) determining one or more respective 2-tuples in M' that correspond with the selected 2-tuple in M, wherein a respective 2-tuple in M' is determined to correspond to the selected 2-tuple in M when the 4-parameter descriptor Γ' associated with that respective 2-tuple in M' fulfills the following set of conditions:

$$\lambda=\lambda_i'$$

$$|\Phi_p|-\pi/2 \leq \Phi_{pi} \leq \pi/2-|\Phi_p|$$

$$|\Phi_q|-\pi/2 \leq \Phi_{qi} \leq \pi/2-|\Phi_q|$$

$$(\tan(\Phi_{qi})\tan(\Phi_q)/\sin(\delta_\theta)^2-(\delta_\Phi^2-2\cos(\delta_\theta)\delta_\Phi+1)=1$$

with $\delta_\theta = \theta_{pi}-\theta_{qi}$ and $\delta_\Phi=(\tan(\Phi_{qi})\tan(\Phi_q))/(\tan(\Phi_{pi})\tan(\Phi_p))$;

(iv) for each corresponding ({$P_i'$, $Q_i'$, $p_i'$, $q_i'$}, {P, Q, p, q}), with i=1, ... N, determining a rigid transformation that aligns or registers the two models M and M', where a rotation $R_i$ from M to M' is given by $$R_i=R_2R_1,$$

where $R_1$ is a rotation that aligns vectors d=Q−P and $d_i'=Q_i'-P_i'$, and $R_2$ is a rotation that aligns vectors $R_1.p$ and $R_1.q$ with the planes defined by normals $p_i'$ and $q_i'$, respectively, and a translation $t_i$ from M to M' is given by $$t_i=P_i'-R_iP_i;$$

(v) using a score function to evaluate how well each rigid transformation $R_i$, $t_i$ aligns model M with model M' and selecting the rigid transformation with the best score function value; and (vi) repeating steps (ii), (iii), (iv), and (v) until a value of a criterion exceeds a threshold.

In some embodiments, the 3D models M and M' each comprises a portion of an object or environment.

In some embodiments, the 3D models M and M' each comprises the complete object or environment.

In some embodiments, the 3D models M and M' at least partially overlap with each other.

In some embodiments, the 3D models M and M' fully overlap with each other.

In some embodiments, the 3D models M and M' comprise: parametric representations of the object or environment expressed using analytic mathematical equations, such that normal and tangent vectors can be exactly determined based on differential calculus; or sets of discrete 3D points with variable spatial density and connectivity, such that normal and tangent vectors can be computed using any suitable discrete numerical method or algorithm.

In some embodiments, step (ii) comprises one of: a random selection of a 2-tuple in M according to a statistical distribution; or a selection of a 2-tuple in M using a priori knowledge or assumptions.

In some embodiments, the method further comprises storing or arranging the descriptors Γ' in binary trees, R-trees, or another data structure.

In some embodiments, the score function scores the quality of alignment of the rigid transformation $R_i$, $t_i$ between model M and model M' by one or more of: measuring distances between close or overlapping points in the two models; measuring angles between vectors associated with close or overlapping points in the two models; or calculating a first score metric comprising measurements of distances between close or overlapping points in the two models, calculating a second score metric comprising measurements of angles between vectors associated with close or overlapping points in the two models, and calculating a weighted combination of the first and second metrics.

In some embodiments, the criterion comprises a score function value, and the threshold comprises a score function value; the criterion comprises a quantity of iterations, and the threshold comprises a number; or the criterion comprises a dimensionality of the model M, and the threshold comprises a number.

In some embodiments, the method further comprises refining a rigid transformation solution resulting from steps (ii)-(v) by applying a local refinement algorithm.

In some embodiments, the the local refinement algorithm comprises an Iterative Closest Point algorithm.

An example embodiment of a method for the registration of a 3D model M of an object or environment, the 3D model M comprising one or more surfaces S, each surface S comprising a set of 3D points P that are represented in a local system of coordinates O and for which the unitary 3D vectors p normal to S are known, with a 3D model M' of the object or environment, the 3D model M' comprising one or more surfaces S, each surface S comprising a set of 3D points P' that are represented in a local system of coordinates O' and for which the unitary 3D vectors p' normal to S are known, where registration comprises determining rotation R and translation t that transform coordinates in O into coordinates in O' such that model M becomes aligned with model M', may include: (i) for model M', defining a plurality of pairs of points P', Q' and corresponding vectors p', q', referred to as 2-tuples point+vector {P', Q', p', q'}, where each 2-tuple is defined by a 4-parameter descriptor Γ' given by:

$$\Gamma'=[\lambda',\theta_{p'},\phi_{q'},\theta_{q'}]^T;$$

with:

$$\lambda' = \|d'\|$$

$$\phi_{p'} = \frac{\pi}{2} - \cos^{-1}\left(\frac{p'^T d'}{\lambda'}\right),$$

$$\phi_{q'} = \frac{\pi}{2} - \cos^{-1}\left(\frac{q'^T d'}{\lambda'}\right),$$

$$\theta_{q'} = \text{sign}(p'^T(d' \times q')) \cdot \cos^{-1}\left(\frac{(q' \times d')^T(p' \times d')}{\|q' \times d'\|\|p' \times d'\|}\right),$$

where d'=P'−Q' and sign represents the signal function; (ii) for model M, selecting a 2-tuple point+vector {P, Q, p, q} and defining the selected 2-tuple by a 4-parameter descriptor Γ given by:

$$\Gamma=[\lambda,\phi_p,\phi_q,\theta_q]^T;$$

(iii) determining one or more respective 2-tuples in M' that correspond to the selected 2-tuple in M with 4-parameter descriptor $\Gamma=[\lambda, \theta_p, \theta_q, \theta_q]^T$, wherein a respective 2-tuple in M' is determined to correspond to the selected 2-tuple in M when the 4-parameter descriptor Γ' associated with that respective 2-tuple M' is equal to Γ or to $\Gamma^*=[\lambda, -\phi_p, -\phi_q, \theta_q]$;
(iv) for each corresponding ({$P_i'$, $Q_i'$, $p_i'$, $q_i'$}, {P, Q, p, q}), with i=1, . . . N, determining a rigid transformation that aligns or registers the two models M and M', where a rotation $R_i$ from M to M' is given by $$R_i = R_2 R_1,$$

where $R_1$ is a rotation that aligns vectors $d=Q-P$ and $d_i' = Q_i' - P_i'$, and $R_2$ is a rotation that aligns vectors $R_1.p$ and $R_1.q$ with the directions defined by vectors $p_i'$ and $q_i'$, respectively, and a translation $t_i$ from M to M' is given by $$t_i = P_i' - P_i;$$

(v) using a score function to evaluate how well each rigid transformation $R_i$, $t_i$ aligns model M with model M' and selecting the rigid transformation with the best score function value; and (vi) repeating steps (ii), (iii), (iv), and (v) until a value of a criterion exceeds a threshold.

In some embodiments, step (iii) comprises using a Nearest Neighbors algorithm to match descriptors Γ" and Γ* to Γ; or organizing model M' in a 3D grid, subdividing M' recursively and intersecting M' with spheres of radius λ centered in each point of M', wherein the centers and the points of intersection, along with the corresponding normals, yield a set of 2-tuples, and pruning the set of 2-tuples by removing the 2-tuples for which descriptors Γ" and Γ* are different from Γ.

In some embodiments, the method further comprises downsizing model M to a set of sparse 3D points P represented in a local system of coordinates O for which the normals p to the surface of the object or environment are known.

In some embodiments, the method further comprises obtaining the model M from successive images or frames acquired by a calibrated camera that moves with respect to the object or environment with a known motion $R_c$, $t_c$, wherein points are matched or tracked across frames, to yield 2D image correspondences x, y, such that their 3D coordinates P can be determined by triangulation, and wherein changes or deformation across successive frames are described by affine transformations A, such that normal p at point location P can be inferred by solving the following system of linear equations:

$$B[\gamma p \gamma g_3 g_6]^T = C,$$

with γ, $g_3$ and $g_6$ being unknown parameters, $$B^T = \begin{bmatrix} t_c^T & 0 & 0 & 0 & 0 & 0 & 0 \\ 0 & 0 & 0 & t_c^T & 0 & 0 & 0 \\ 0 & 0 & 0 & 0 & 0 & 0 & t_c^T \\ & & & R_c(:)^T & & & \\ -y^T & -1 & 0 & 0 & 0 & x_1 y^T & x_1 \\ 0 & 0 & 0 & -y^T & -1 & x_2 y^T & x_2 \end{bmatrix}$$

and $$C^T = \begin{bmatrix} A(:,1)^T & 0 & A(:,2)^T & 0 & (y - Ax)^T & 1 \end{bmatrix}$$

where T(:) denotes the vectorization of matrix T, T(:, j) represents column j of matrix T and $x=(x_1, x_2)$.

In some embodiments, one or more of steps (ii), (iii), (iv), or (v) are performed in parallel with obtaining the model M from successive images or frames.

In some embodiments, models M and M' are curves, the unitary vectors p, q, p', q' are tangents to the curves, and the registration is curve-to-curve.

An example embodiment of a system may include a computer-readable memory storing instructions and a processor configured to execute the instructions to perform a method including: gradually acquiring a 3D model M of an object or environment, the 3D model M comprising 3D points P and associated unitary 3D vectors p that are represented in a local system of coordinates O; and registering M with a 3D model M' of the object or environment, the model M' comprising 3D points P' and associated unitary 3D vectors p' that are represented in a local system of coordinates O', the model M' being previously acquired, where registering M with M' comprises determining rotation R and translation t that transform coordinates in O into coordinates in O' such that model M becomes aligned with model M', wherein registering M with 3D model M' comprises: (i) for model M', defining a plurality of 2-tuples, each 2-tuple in M' comprising a pair of points and a corresponding pair of vectors; (ii) for model M, selecting a 2-tuple comprising a pair of points and a corresponding pair of vectors; (iii) determining one or more respective 2-tuples in M' that correspond with the selected 2-tuple in M; (iv) for each 2-tuple in M' that corresponds with the selected 2-tuple in M, determining a rigid transformation that aligns or registers the two models M and M', where a rotation $R_i$ from M to M' is given by $$R_i = R_2 R_1,$$

where $R_1$ is a rotation that aligns a first vector that extends from the first point in the M' 2-tuple to the second point in the M' 2-tuple with a second vector that extends from the first point in the M 2-tuple to the second point in the M 2-tuple, and $R_2$ is a rotation that aligns the vectors in the M' 2-tuple with respective directions respectively defined by, or with respective planes respectively orthogonal to, the vectors in the M 2-tuple, and a translation $t_i$ from M to M' is given by a difference between the first point in the M' 2-tuple and the product of $R_i$ and the first point in the M 2-tuple; (v) using a score function to evaluate how well each rigid transformation $R_i$, $t_i$ aligns model M with model M' and selecting the rigid transformation with the best score function value; and (vi) repeating steps (ii), (iii), (iv), and (v) until a value of a criterion exceeds a threshold, wherein registering M with M' is performed in parallel with gradually acquiring the 3D model M. The method performed by the processor when executing the instructions may further include communicating a progress of the registering to a user while the registering is being performed, receiving a control input from the user responsive to the communication, and altering an aspect of the gradual acquisition of the 3D model M based on the control input.

In some embodiments, the system further comprises a device for capturing data comprising the 3D model M, the device comprising one or more of: a tracked touch-probe; a video camera; a time-of-flight sensor or device; or a RGB-D camera.

In some embodiments, the model M' is based on one or more of: computed tomography (CT) data; magnetic resonance imaging (MRI) data; passive stereo or multi-view video images; structured light or time-of-flight data; or a statistical model.

In some embodiments, the gradual acquisition of the 3D model M is automated, further wherein the communicated progress of registering is used as feedback in a control loop for the automated gradual acquisition.

In some embodiments, the system is used for computer assisted execution of arthroscopic procedures including, but not limited to, anterior and/or posterior cruciate ligament reconstruction, resection of femuro-acetabular impingement, or diagnosis and repair of confocal defects in cartilage, wherein a arthroscopic camera used for visualizing the articular joint.

In some embodiments, the system is used for computer assisted execution of open surgical procedures in orthopedics, including, but not limited to, total hip replacement, total knee replacement, unicompartmental knee replacement, shoulder joint replacement, and pedicle-screw placement, wherein a camera is used to observe the operating field.

An example embodiment of system may include a computer-readable memory storing instructions and a processor configured to execute the instructions to perform a method comprising: acquiring a 3D model M of an object or environment, the 3D model M comprising 3D points P and associated unitary 3D vectors p that are represented in a local system of coordinates O; and after acquiring M, registering M with a 3D model M' of the object or environment, the model M' comprising 3D points and associated unitary 3D vectors p' that are represented in a local system of coordinates O', the model M' being previously acquired, where registering M with M' comprises determining rotation R and translation t that transform coordinates in O into coordinates in O' such that model M becomes aligned with model M', wherein registering M with 3D model M' comprises: (i) for model M', defining a plurality of pairs of points P', Q' and corresponding vectors p', q', referred to as 2-tuples point+vector {P', Q', p', q'}, where each 2-tuple is defined by a 4-parameter descriptor Γ' given by:

$$\Gamma' = [\lambda', \phi_{p'}, \phi_{q'}, \theta_{q'}]^T;$$

with:

$$\lambda' = \|d'\|$$

$$\phi_{p'} = \frac{\pi}{2} - \cos^{-1}\left(\frac{p'^T d'}{\lambda'}\right),$$

$$\phi_{q'} = \frac{\pi}{2} - \cos^{-1}\left(\frac{q'^T d'}{\lambda'}\right),$$

$$\theta_{q'} = \text{sign}(p'^T(d' \times q')) \cdot \cos^{-1}\left(\frac{(q' \times d')^T(p' \times d')}{\|q' \times d'\|\|p' \times d'\|}\right).$$

where d'=P'−Q' and sign represents the signal function; (ii) for model M, selecting a 2-tuple point+vector {P, Q, p, q} and defining the selected 2-tuple by a 4-parameter descriptor Γ given by:

$$\Gamma = [\lambda, \phi_p, \phi_q, \theta_q]^T;$$

(iii) determining one or more respective 2-tuples in M' that correspond with the selected 2-tuple in M; (iv) for each corresponding ({P$_i$', Q$_i$', p$_i$', q$_i$'}, {P, Q, p, q}), with i=1, . . . N, determining a rigid transformation that aligns or registers the two models M and M', where a rotation R$_i$ from M to M' is given by $$R_i = R_2 R_1,$$

where R$_1$ is a rotation that aligns vectors d=Q−P and d$_i$'=Q$_i$'−P$_i$', and R$_2$ is a rotation that aligns vectors R$_1$.p and R$_1$.q to directions defined by, or planes orthogonal to, the vectors p$_i$' and q$_i$', respectively, and a translation t$_i$ from M to M' is given by $$t_i = P_i' - R_i P;$$

(v) using a score function to evaluate how well each rigid transformation R$_i$, t$_i$ aligns model M with model M' and selecting the rigid transformation with the best score function value; and (vi) repeating steps (ii), (iii), (iv), and (v) until a value of a criterion exceeds a threshold.

BRIEF DESCRIPTION OF THE DRAWINGS

For a more complete understanding of the present disclosure, reference is made to the following detailed description of exemplary embodiments considered in conjunction with the accompanying drawings.

FIG. 1A(a) is the case of a dense surface mesh S, FIG. 1A(b) refers to a sparse set of curves and contours C, and FIG. 1A(c) is a set of points or landmarks.

FIG. 1B(a), FIG. 1B(c) and FIG. 1B(e) refer to the problem of registering points with points, curves, and surfaces, respectively. FIG. 1B(b) is the surface-vs-surface alignment problem. FIG. 1B(d) represents the curve-vs-surface problem and FIG. 1B(f) is the curves-vs-curves problem. Solutions for the alignments shown in FIG. 1B(b), FIG. 1B(d), FIG. 1B(e) and FIG. 1B(f) can be found by making use of local differential information.

FIG. 1C illustrates a possible intra-operative navigation system, with curve C being acquired intra-operatively and surface S being obtained from a pre-operative image of the patient such as a CT or a MRI. For this particular embodiment, the 3D curve C is reconstructed by performing a random walk on the bone surface with a visually tracked touch probe using the video-based navigation scheme disclosed in PCT/US2016/024262. The registration result is used to realistically overlay the 3D surface S in video images using augmented reality techniques or, in alternative, to overlay the curve C on the pre-operative surface model S using virtual reality.

(FIG. 2C(a)) the proposed local reference frame created from {P, Q, p, q}, which is a 2-tuple point+vector, where the vector can be a tangent or a normal, that allows the establishment of a FIG. 2C(b)) translation- and rotation-invariant descriptor Γ.

Figure 2A:
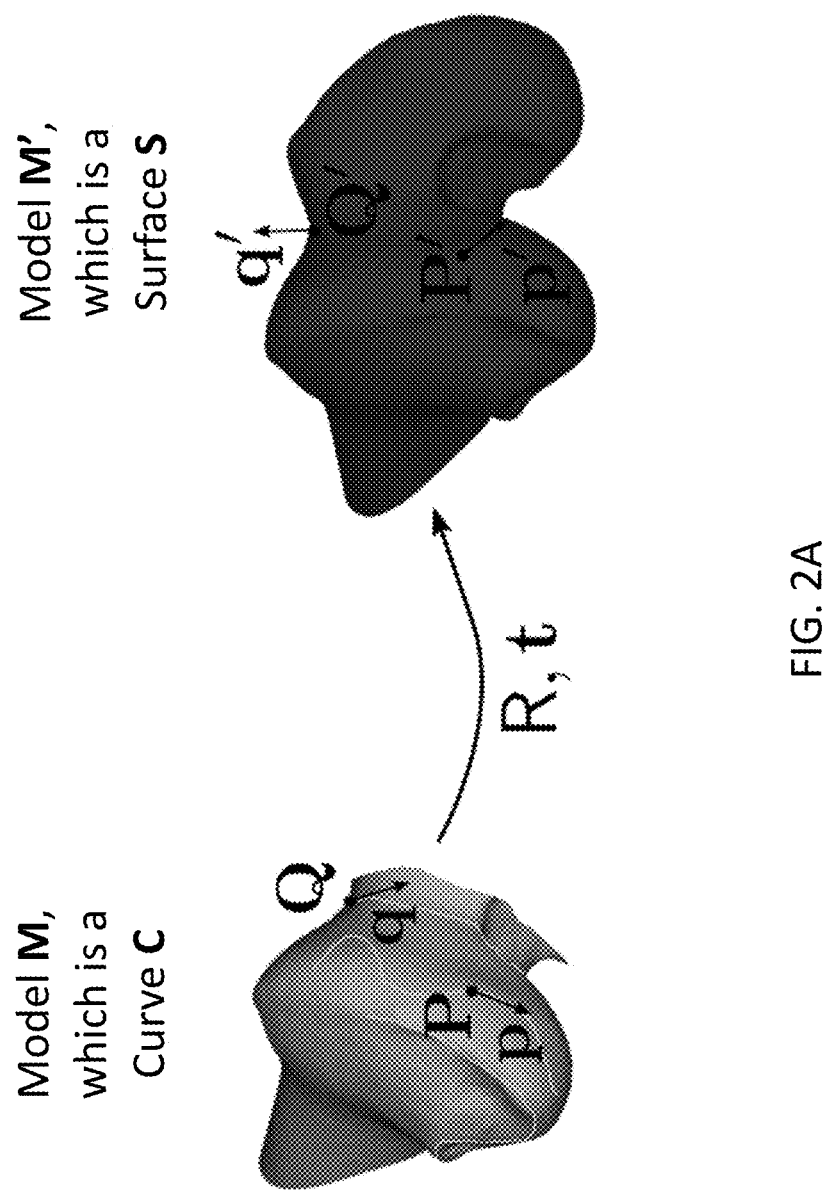
FIG. 2A shows a matching 2-tuple between models M and M', where P, Q, with tangents p, q, are the points in curve C and P', Q' with normals p', q', are the points in surface S. Both the points and their first order derivatives are used not only for computing the rigid transformation R, t between the models, but also to constrain the search for corresponding 2-tuples.
Figure 2B:
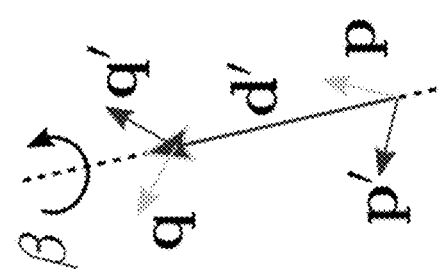
FIG. 2B illustrates the estimation of the rotation, R, between curve C and surface S, which can be divided into the estimation of (FIG. 2B(a)) a rotation R$_1$ with amplitude α around axis ω which is orthogonal to vectors d=Q−P and d'=Q'−P' and (FIG. 2B(b)) a rotation R$_2$ with amplitude β around vector d'.
Figure 2B:
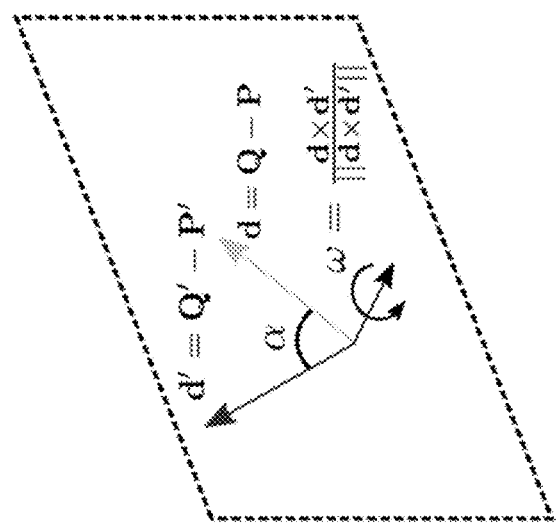
Figure 2C:
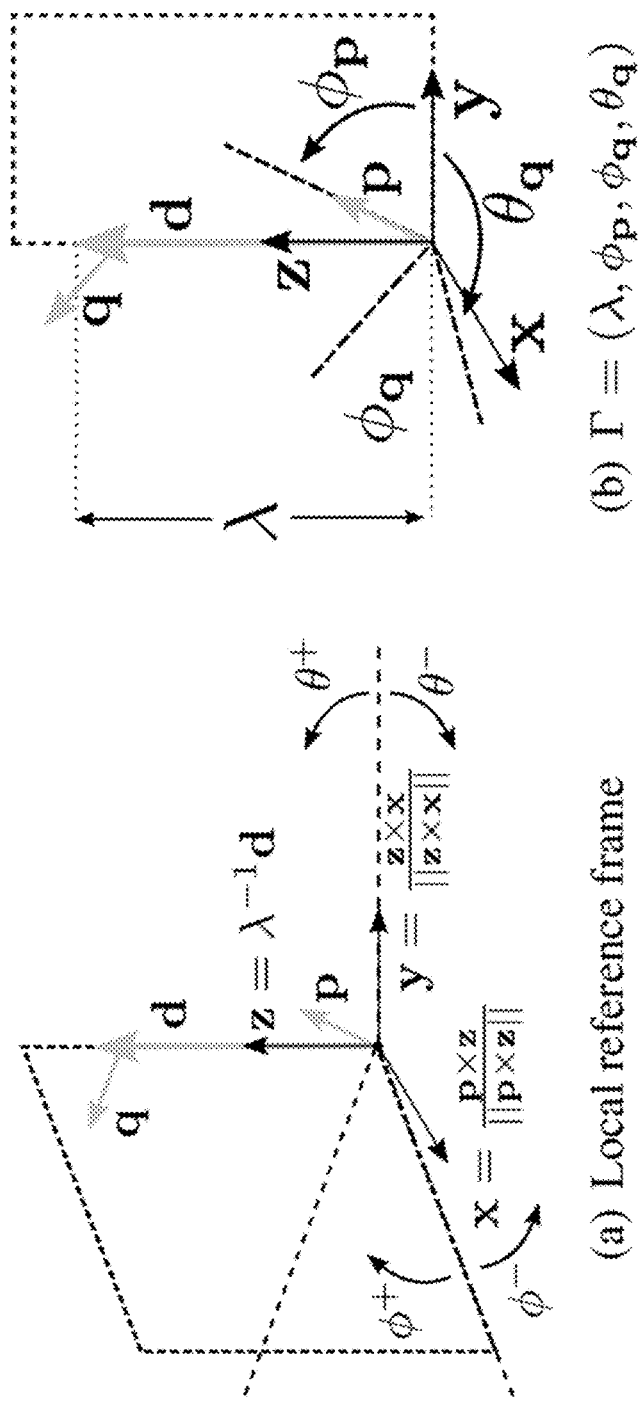
FIG. 2C depicts how a 2-tuple point+vector, where P, Q are two points and p, q are the corresponding vectors, can be described in a translation and rotation invariant manner by a 4-parameter descriptor.
Figure 2D:
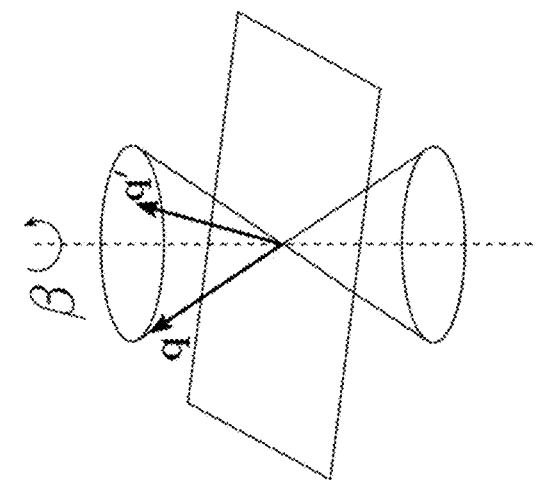
FIG. 2D illustrates the conditions for a tangent q on the side of curve model C to lie in the plane defined by a normal q' on the side of surface model S, where in (FIG. 2D(a))
Figure 2D:
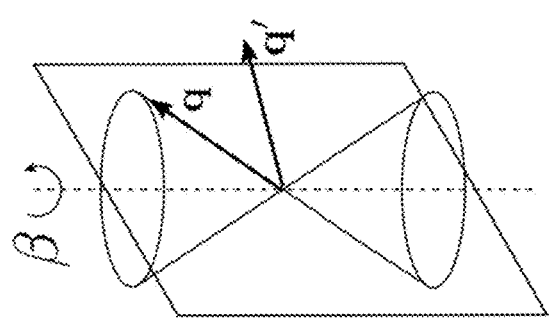

there is no rotation that makes such alignment possible and in (FIG. 2D(b)) there exists a rotation for which q lies in the plane defined by q'.

Figure 2E:
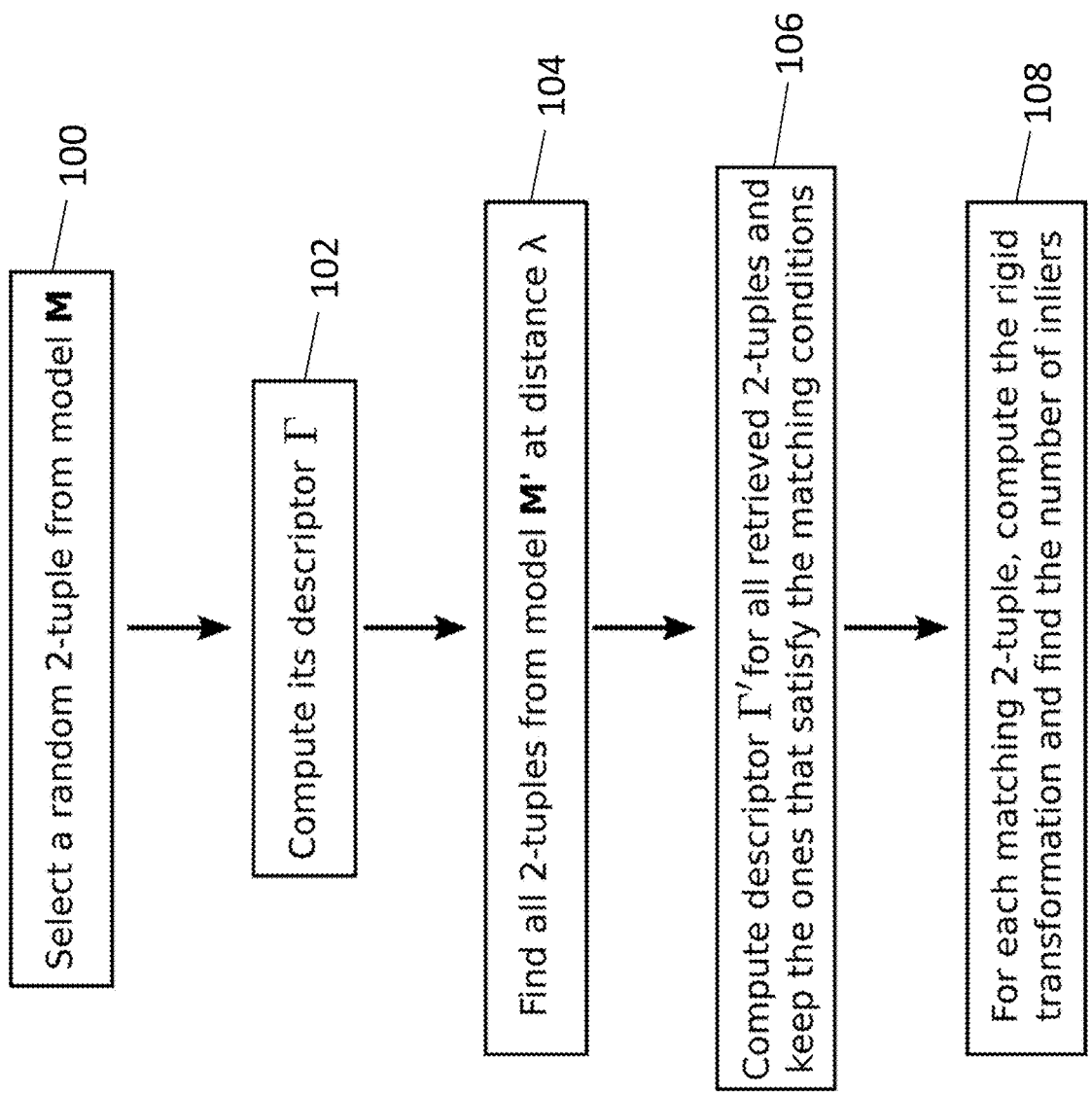

FIG. 2E shows the sequence of steps of a RANSAC iteration of a proposed search scheme for the registration of model M with model M' that works fully online by finding matching 2-tuples, computing the rigid transformation and determining the number of inliers without using any pre-processed data structures.

Figure 2F:
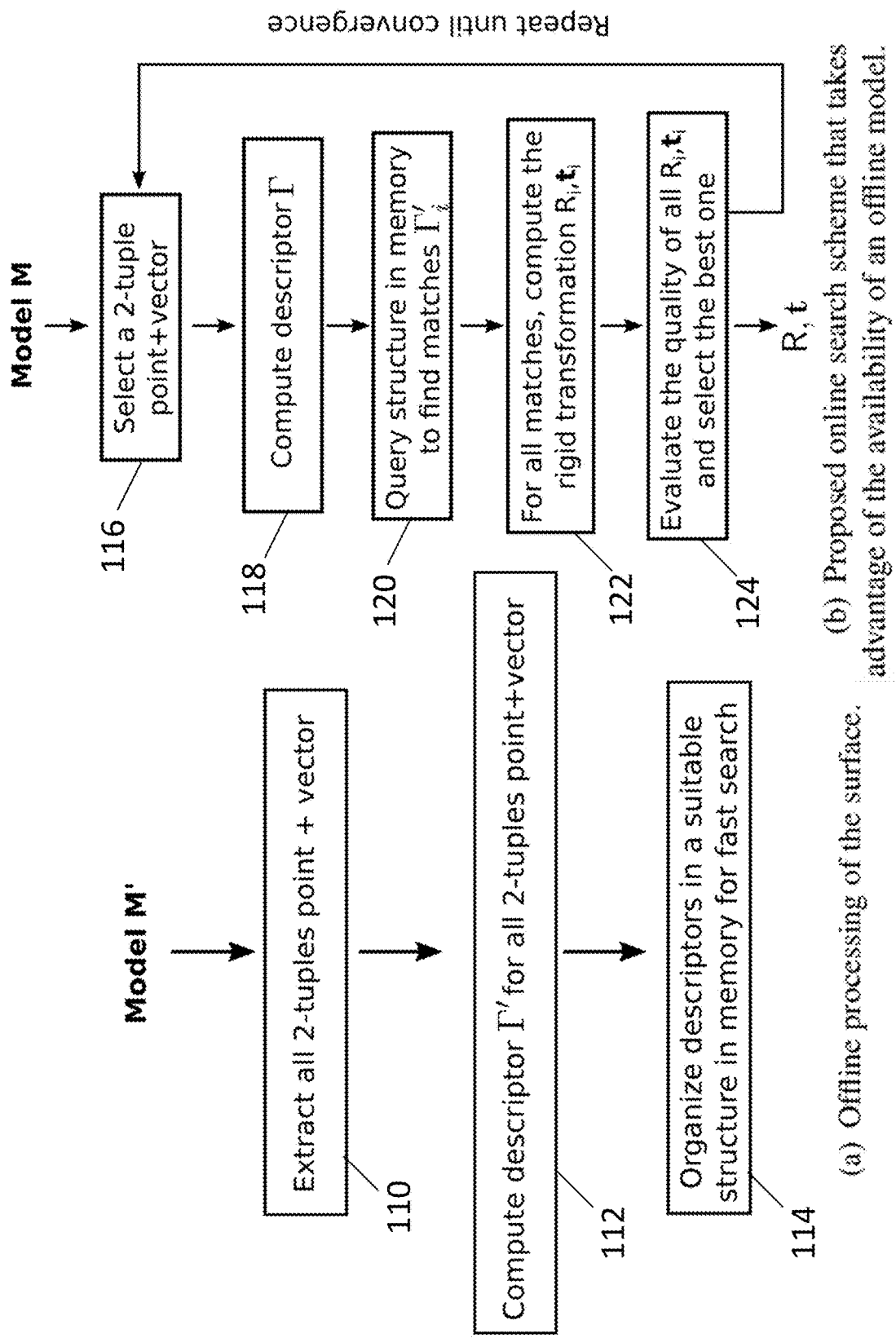

FIG. 2F shows the sequences of steps of the proposed (a) offline and (b) online schemes for fast registration of model M with model M'. FIG. 2F(a) describes the offline scheme for processing model M', that is stored in memory, in order to organize its 2-tuples in a structure that is adequate for fast query. FIG. 2F(b) illustrates an embodiment of an online search scheme that makes use of the structure created in the offline stage and outputs the rigid transformation R, t between models M and M'.

Figure 3:
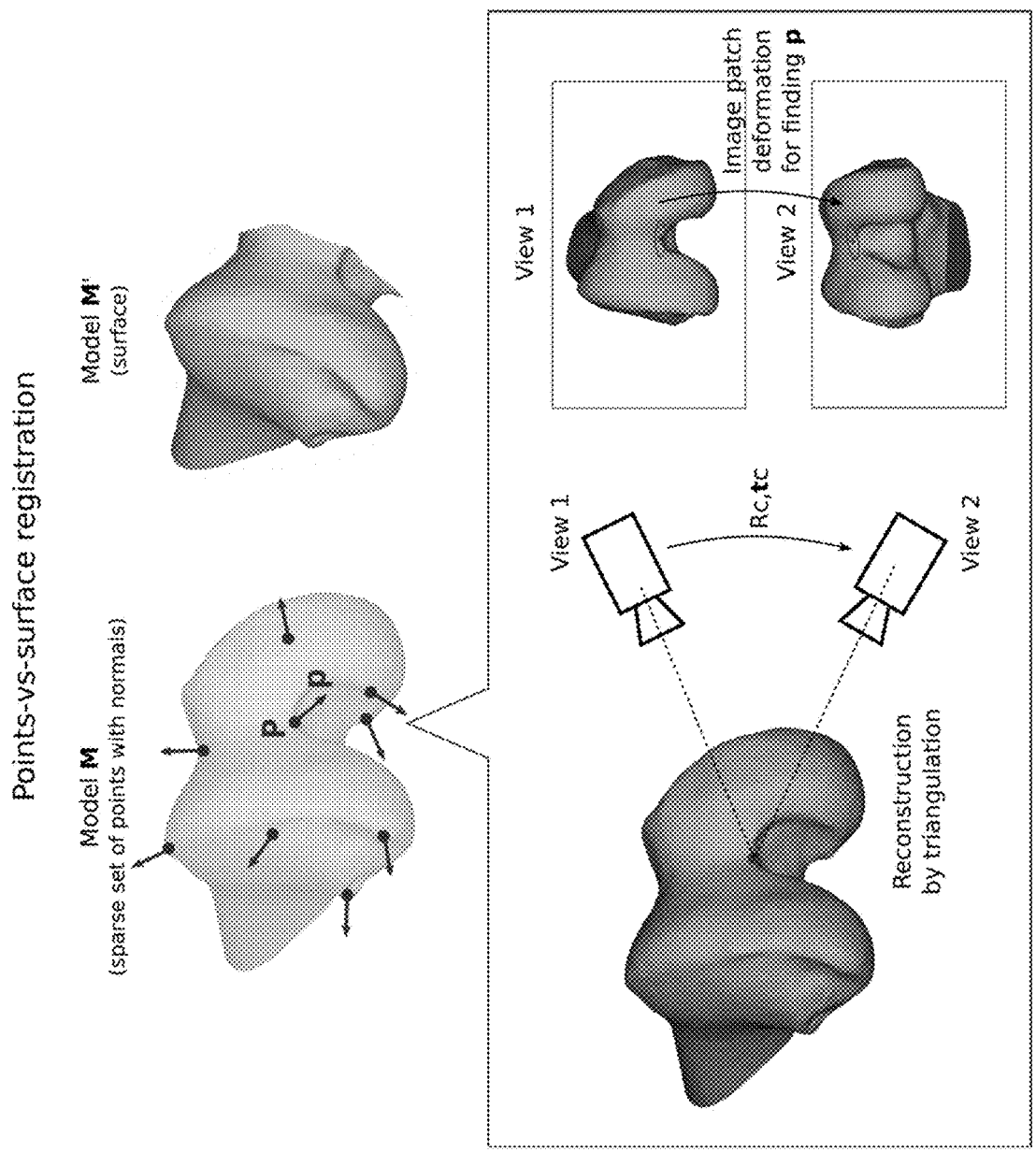

FIG. 3 is an embodiment of the points-vs-surface registration, with model M being a sparse set of 3D points with normals and model M' being a surface. The 3D points can be obtained from a sequence of frames with known camera motion Rc, tc, by triangulating the matching image points. From the deformation of the image patches around the image points, it is also possible to recover normal p at the 3D point location P.

Figure 4:
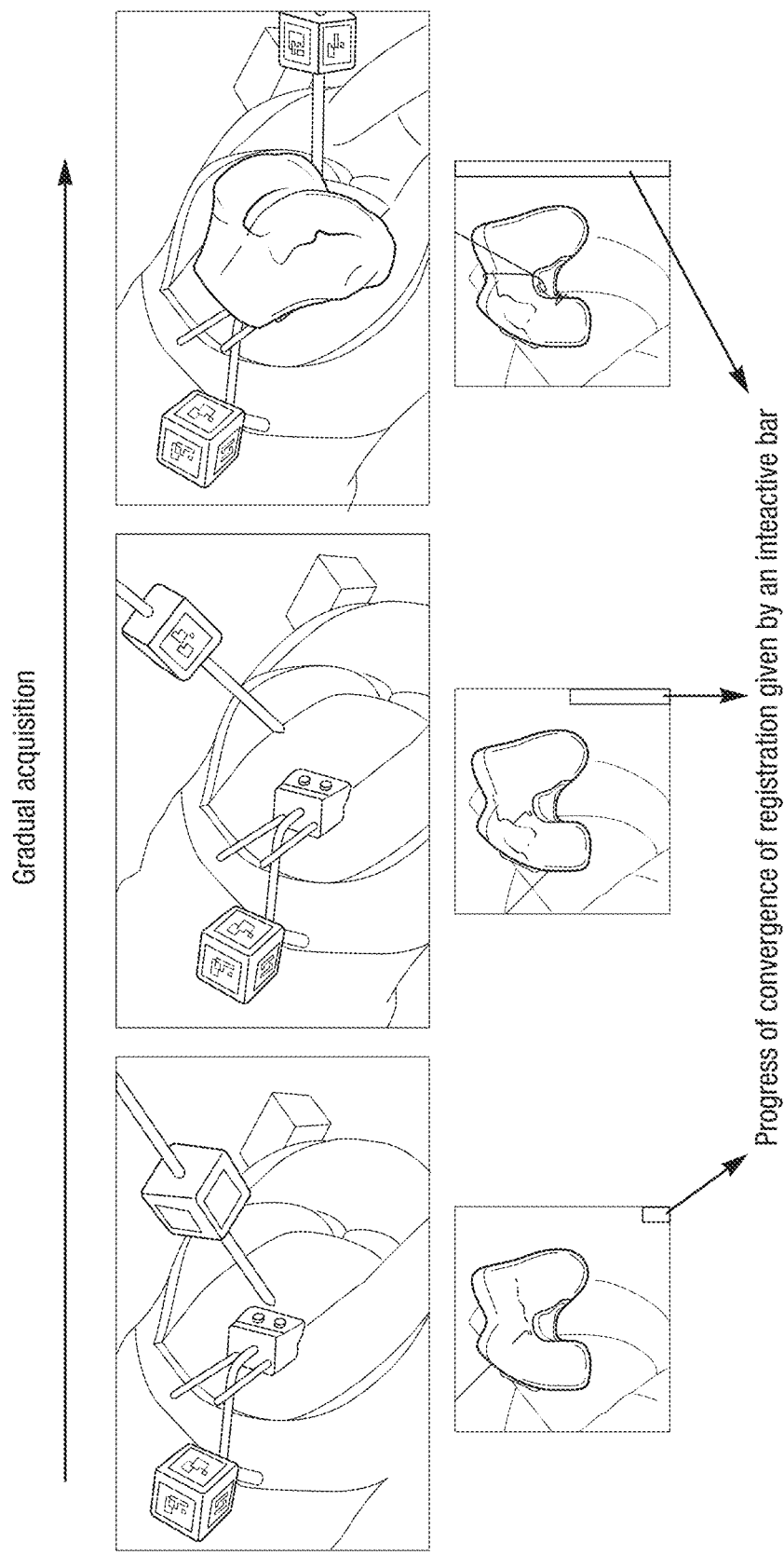

FIG. 4 is an embodiment of the execution of the registration of model M, which is a curve C, with model M', which is a surface S (curve-vs-surface), where model M is gradually acquired and, in parallel, the registration is performed using increasing amounts of data from successive instants. Information on the progress of convergence of the registration is provided on-the-fly to the user using an interactive bar that becomes greener as the registration converges.

Figure 5A:
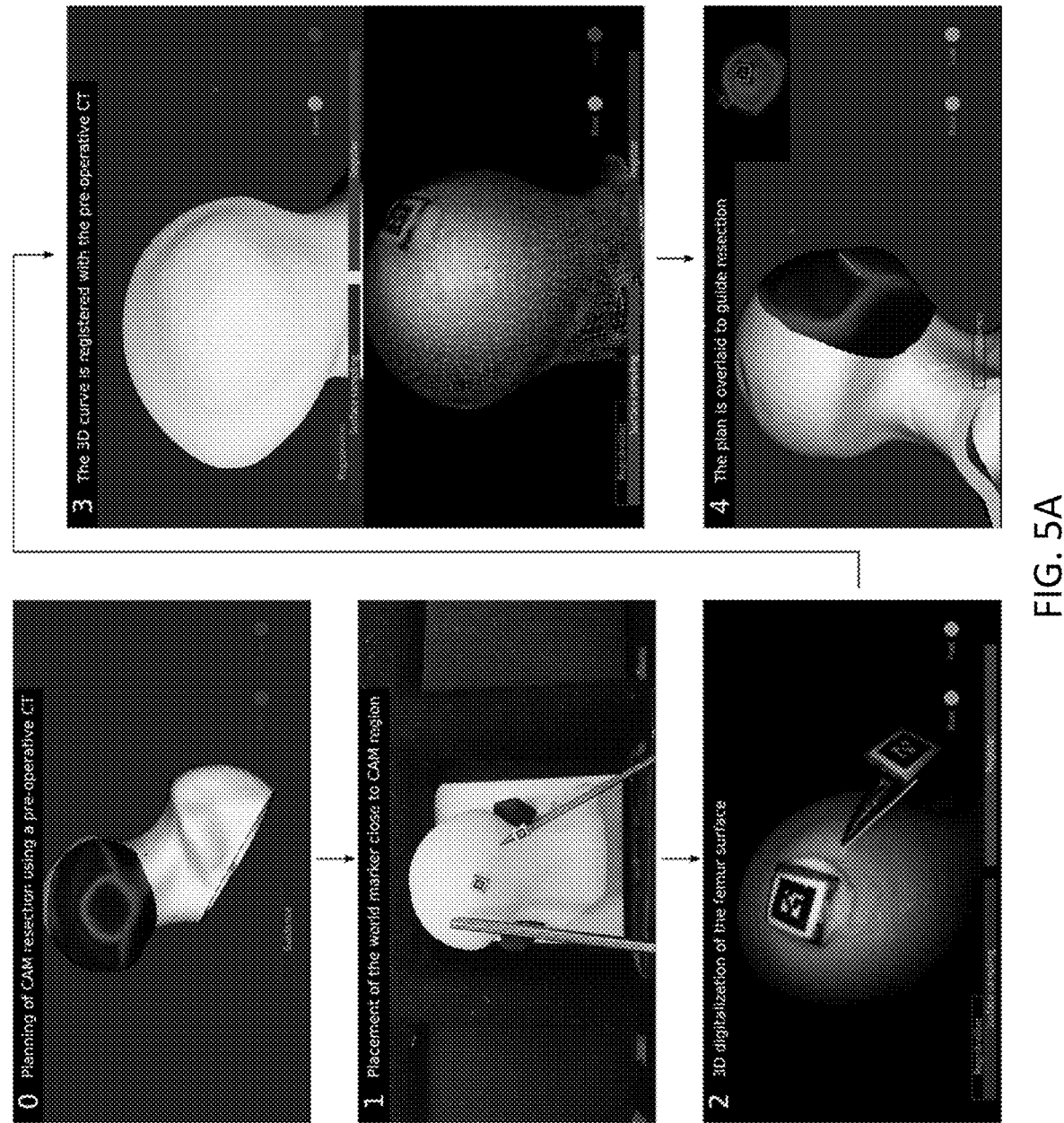

FIG. 5A is an embodiment of the workflow for the intra-operative navigation system applied to the FAI resection procedure. The pre-operative step consists in planning the cam location, extension and depth using a CT scan (or MRI) of the patient's hip. In the navigation procedure, the surgeon starts by attaching a marker near the area that will be resected. Then, using a tool instrumented with a marker, the bone surface is scratched for reconstructing 3D contours that are afterwards registered with the pre-operative model. Knowing the rigid transformation between the bone and the virtual model allows the pre-operative plan to be overlaid, both on the bone in the video stream and on the virtual model. This visual information guides the surgeon during the resection procedure.

Figure 5B:
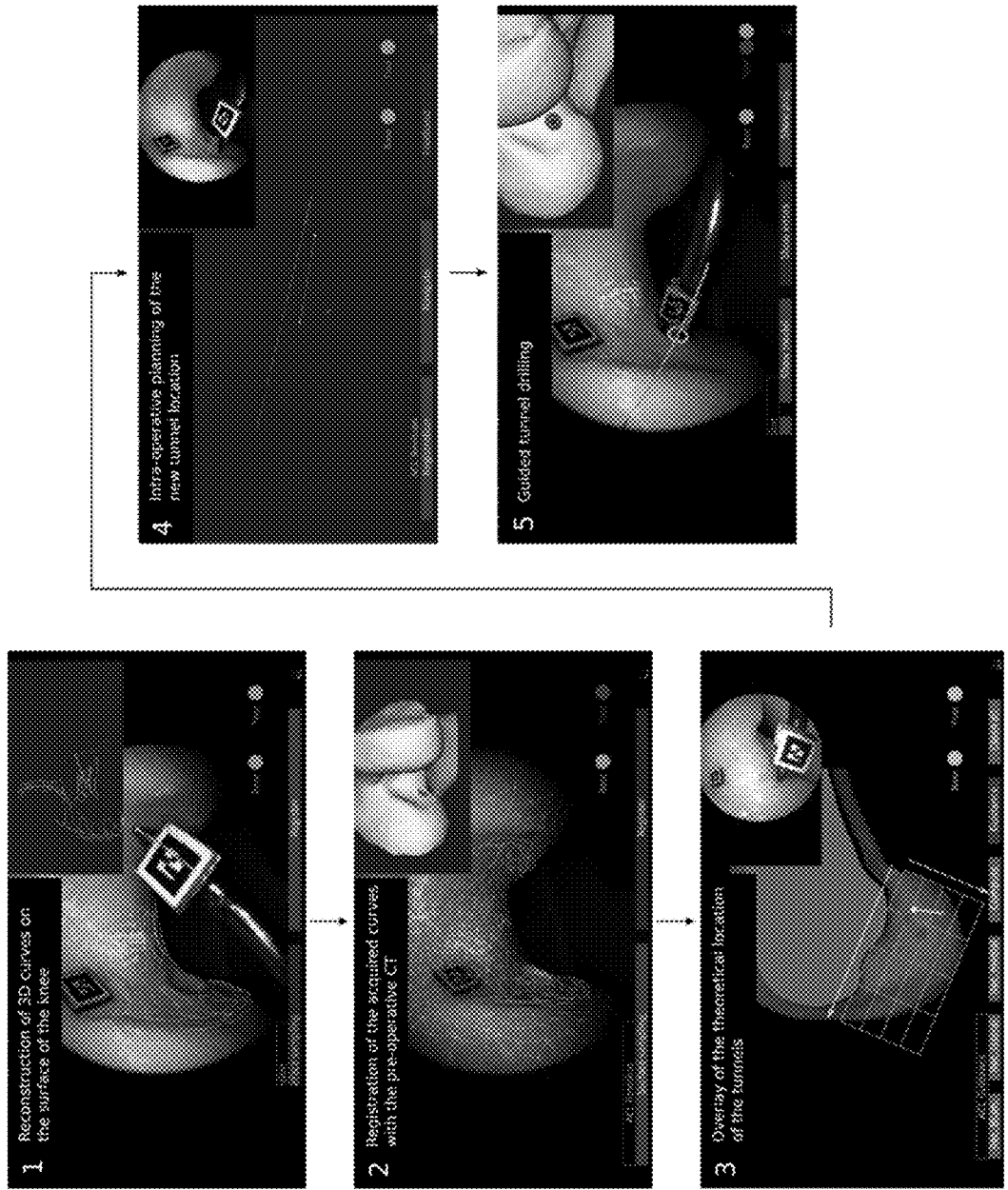

FIG. 5B is an embodiment of the workflow for the intra-operative navigation system applied to the ACL revision procedure. After attaching a marker to the knee in the inter-condyle region, 3D curves are reconstructed by touching the bone surface with an instrumented tool. The pre-operative CT scan (or MRI) is registered with these curves, allowing the location and orientation of the old tunnel to be overlaid in the image using augmented reality, and visualized in 3D using virtual reality. This enables the surgeon to intra-operatively plan the placement of the new tunnel because the navigation system provides the distance and angle between the old and the new tunnels in real time. The last step is a guided tunnel drilling, which is possible because the drill is instrumented with a marker, and thus its location and orientation is always known.

Figure 5C:
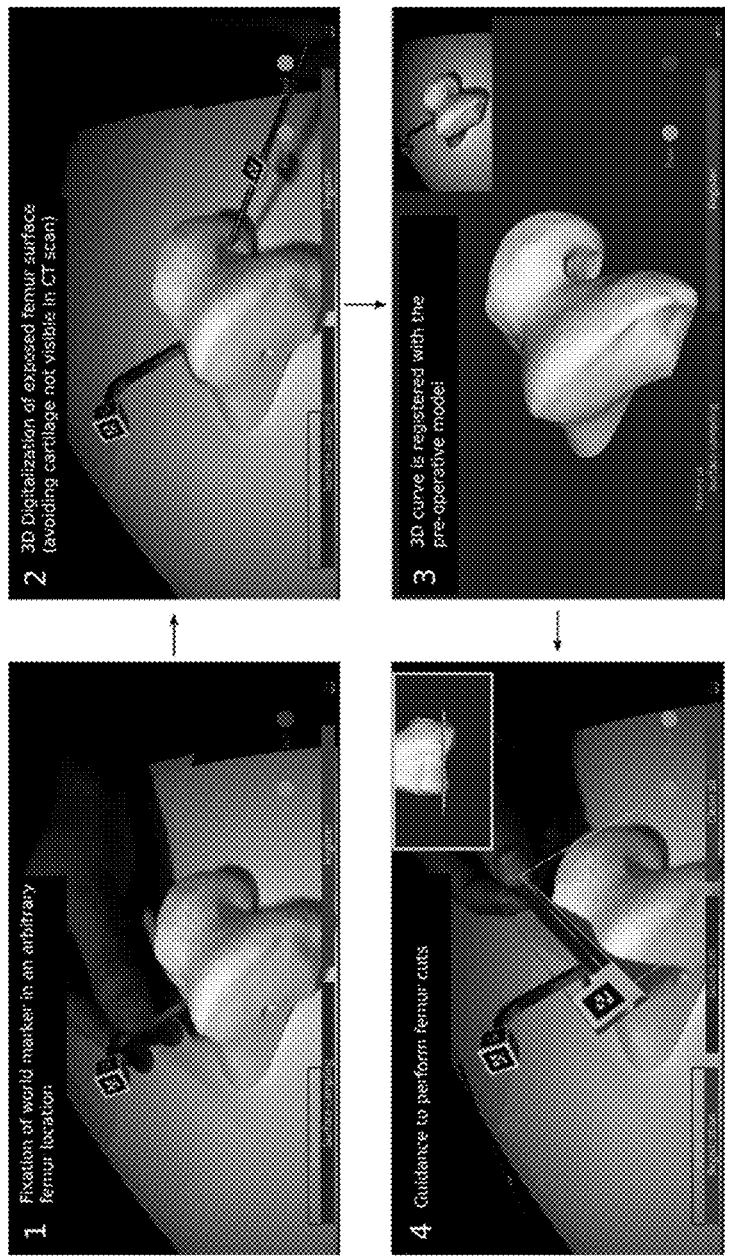

FIG. 5C is an embodiment of the workflow for the intra-operative navigation system applied to the total knee arthroplasty (TKA) procedure. A marker is attached to the knee and the 3D digitalization of the femur surface is performed, taking into account that the cartilage areas should be avoided since they are not visible in the CT scan. Curve-vs-surface registration is performed, allowing the pre-operative plan of the femur cut to be overlaid in the video stream using augmented reality and represented in 3D, together with the virtual model, using virtual reality. This information guides the surgeon during bone resection, either by directly guiding an instrumented saw or guiding a mechanical guide to which the saw will be attached.

Figure 6:
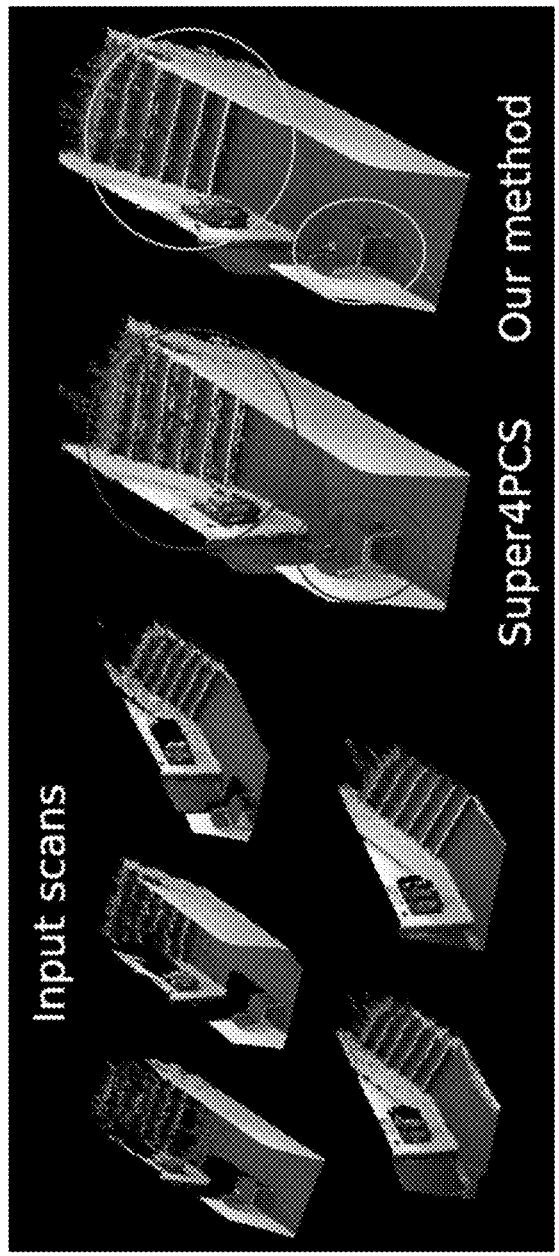

FIG. 6 is an embodiment of a possible application of the disclosed registration methods in robotics and computer graphics. FIG. 6 compares the alignment performed with the extension of the disclosed method for surface-vs-surface registration with the alignment accomplished with the Super4PCS method (state-of-the-art algorithm). The left side shows the five 3D scans obtained with an RGB-D camera that were used as input, while the right side shows the alignment results outputted by each method with an highlight of the regions where differences in accuracy are observable. The results with the disclosed method are substantially better and were obtained in 20% of the time used by Super4PCS.

Figure 7:
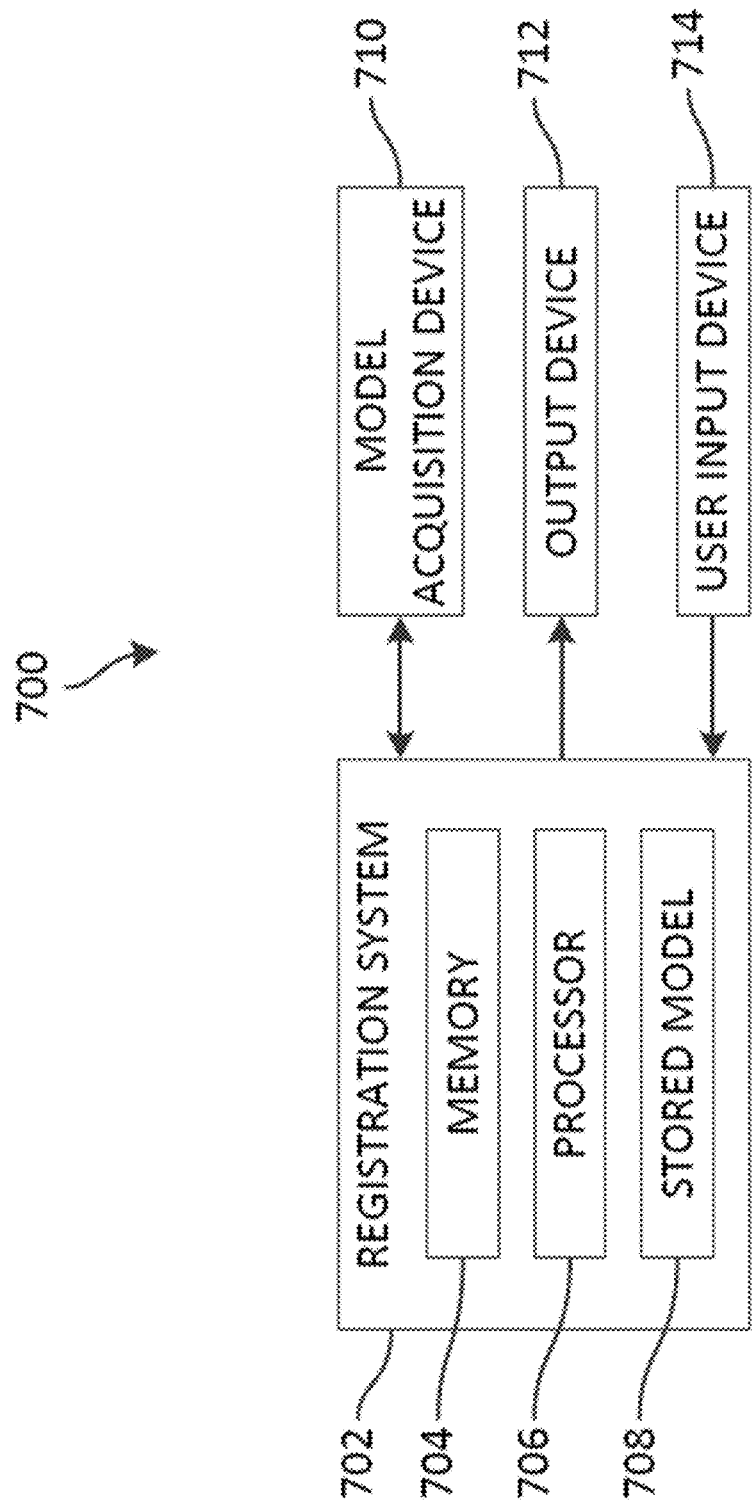

FIG. 7 is a block diagram illustrating an example embodiment of a system for carrying out one or more steps, processes, and/or methods of this disclosure.

Figure 8:
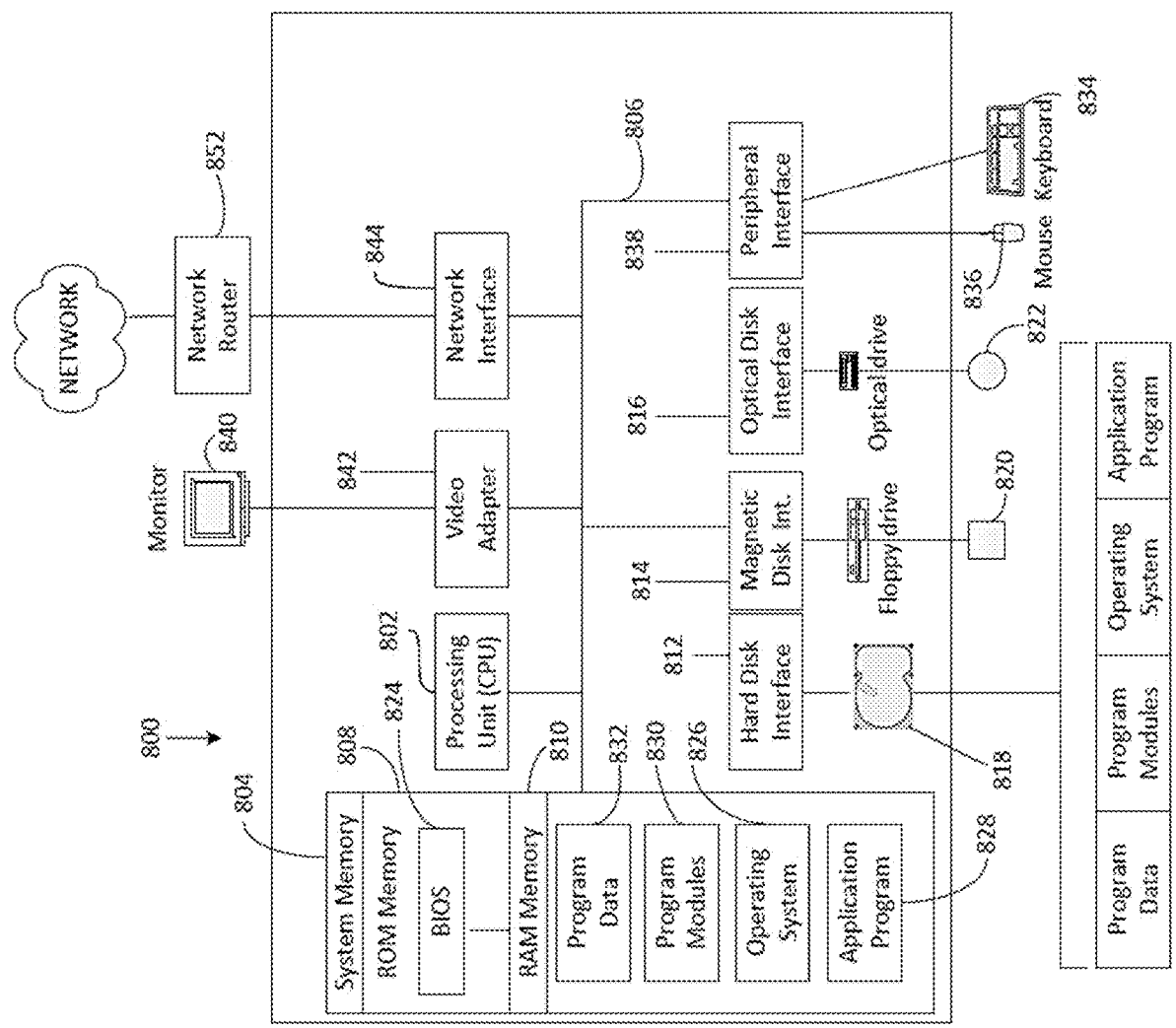

FIG. 8 is a diagrammatic view of an illustrative computing system that may find use with the systems and methods of the present disclosure.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments.

Specific details are given in the following description to provide a thorough understanding of the embodiments. However, it will be understood by one of ordinary skill in the art that the embodiments may be practiced without these specific details. For example, systems, processes, and other elements in the presently disclosed embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Subject matter will now be described more fully with reference to the accompanying drawings, which form a part hereof, and which show, by way of illustration, specific example aspects and embodiments of the present disclosure. Subject matter may, however, be embodied in a variety of different forms and, therefore, covered or claimed subject matter is intended to be construed as not being limited to any example embodiments set forth herein; example embodiments are provided merely to be illustrative. The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One or more embodiments disclosed herein applies to Computer-Aided Orthopedic Surgery (CAOS) and, more specifically, to intra-operative navigation during arthroscopy and conventional open surgery of knee and hip. However, the application of the presently disclosed embodiments can include other surgical procedures and clinical specialties requiring the alignment of two distinct 3D data sets, models, or representations of a rigid, or quasi-rigid, anatomical part. The disclosed embodiments can also have applications in domains other that medicine, such as computer vision, computer graphics, or robotics, for the purpose of aligning or overlaying different 3D data sets, models or representations of the same, or topologically similar, 3D objects or surfaces.

Unless otherwise noted, points are represented by their vector of projective coordinates that is denoted with an upper case bold letter (e.g., P) and vectors are represented with lower case bold letters (e.g., p). Scalars are indicated by plain letters (e.g., $\Phi$, K). Matrices are denoted by Sans Serif (e.g., R).

Figure 1A:
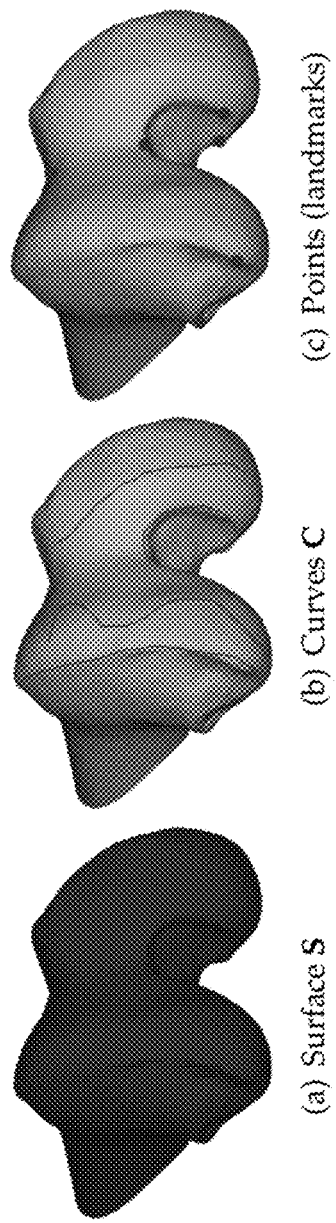
FIG. 1A shows exemplary embodiments of different types of 3D models or representations that can be used as input in a 3D registration method.

Any of the models can be a surface or dense point cloud, a sparse set of curves or contours, or a sparse set of isolated points or landmarks, as shown in FIG. 1A. FIG. 1A shows exemplary embodiments of different types of 3D models or representations that can be used as input in a 3D registration method: FIG. 1A(a) is the case of a dense surface mesh S, FIG. 1A(b) refers to a sparse set of curves and contours C, and FIG. 1A(c) is a set of points or landmarks.

Figure 1B:
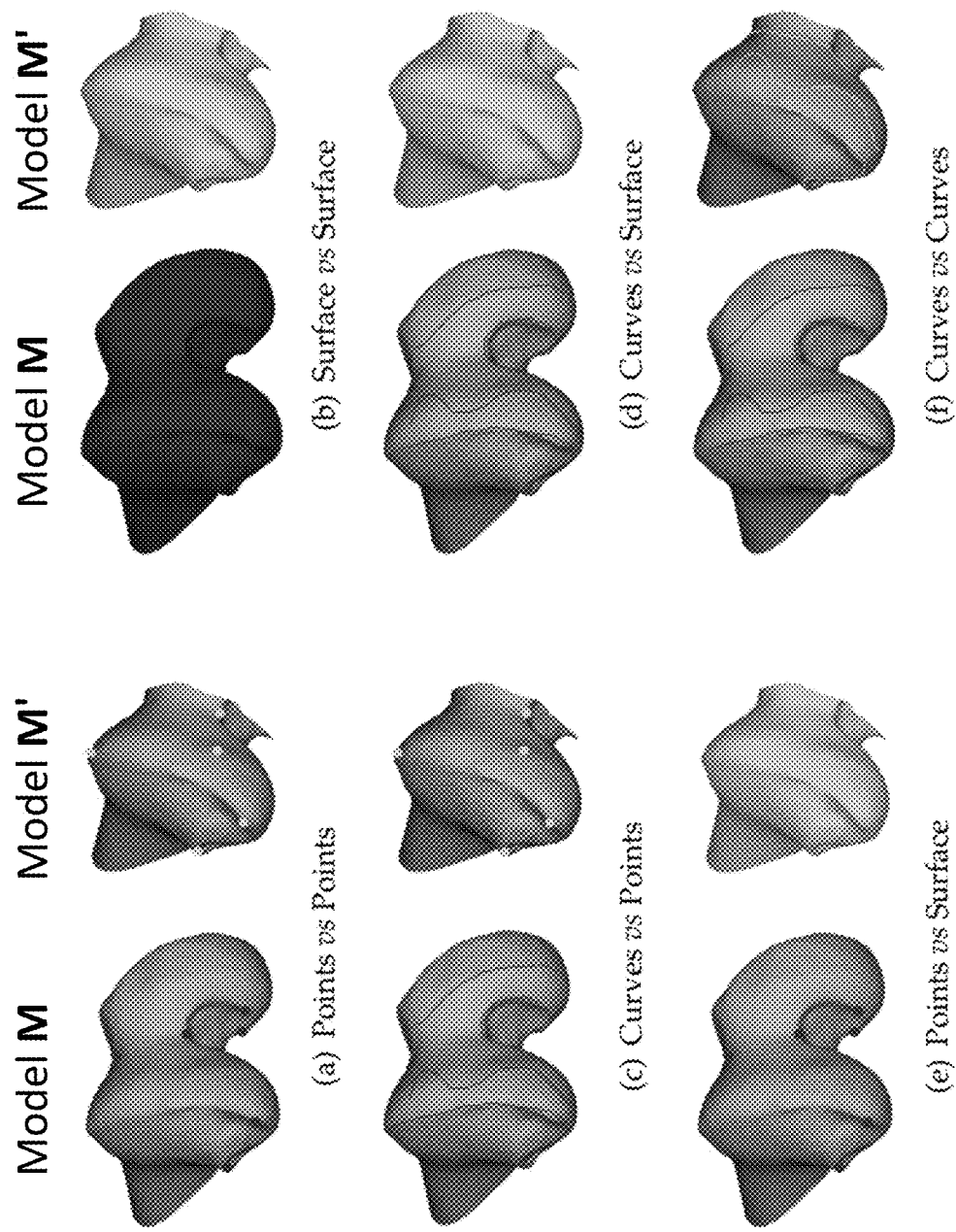
FIG. 1B is an embodiment of the possible alternatives of registration using the three different types of 3D models shown in FIG. 1A.

FIG. 1B shows the possible combinations of different types of 3D models to be registered, yielding different variants of the problem. FIG. 1B is an embodiment of the possible alternatives of registration using the three different types of 3D models shown in FIG. 1A. FIG. 1B(a), FIG. 1B(c) and FIG. 1B(e) refer to the problem of registering points with points, curves, and surfaces, respectively. FIG. 1B(b) is the surface-vs-surface alignment problem. FIG. 1B(d) represents the curve-vs-surface problem and FIG. 1B(f) is the curves-vs-curves problem. Solutions for the alignments shown in FIG. 1B(b), FIG. 1B(d), FIG. 1B(e) and FIG. 1B(f) can be found by making use of local differential information.

Cases of points-vs-points are shown in FIG. 1B(a) and surface-vs-surface is shown in FIG. 1B(b), and situations of at least one of the models being a curve are shown in FIG. 1B(c), FIG. 1B(d), and FIG. 1B(f).

Figure 1C:
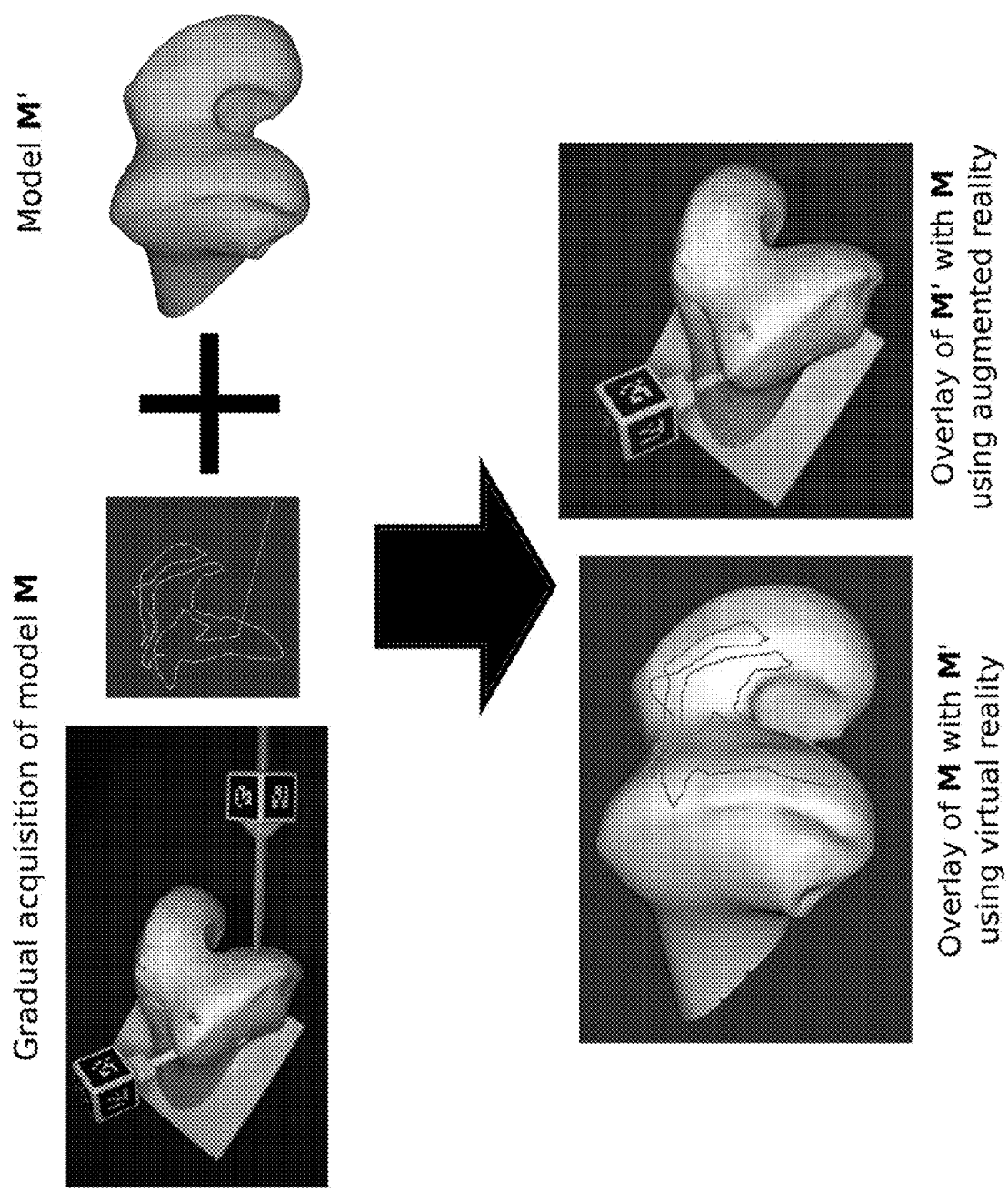
FIG. 1C is an embodiment of the registration of model M, which is a curve C with model M', which is a surface S (curve-vs-surface registration), where M is gradually acquired using a visually tracked touch probe.

The present disclosure is of practical significance in Computer-Aided Orthopedic Surgery (CAOS) that has applications both in arthroscopy and in conventional open procedures. A problem is in aligning a sparse set of 3D curves or contours that are reconstructed intra-operatively, with a 3D surface or dense point cloud that usually corresponds to a pre-operative CT or MRI of the targeted bone anatomy. This is illustrated in FIG. 1C for the case of the intra-operative 3D reconstruction being carried using the methods and systems disclosed in the international patent PCT/US2016/024262. The 3D curves or contours are obtained by randomly grasping the bone surface with a touch probe while a free-moving camera simultaneously observes the visual markers attached to probe and bone anatomy. The objective is to determine the rigid transformation that aligns the pre-operative 3D image, expressed in an arbitrary local reference frame, with the 3D contours referenced in the coordinate system of the visual marker attached to the bone. Such transformation enables to overlay the pre-operative 3D image with the patient's anatomy in the OR for the purpose of guiding surgical execution or, in an inverse manner, to overlay the 3D contours in the pre-operative 3D image.

The method for curve-vs-surface registration herein disclosed uses point locations, together with local differential information of the curve and surface at those point locations, namely tangents and normals, to establish correspondences between the two 3D models and estimate the rigid transformation that aligns them. In particular it is disclosed that, by exploring local differential information, it is possible to dramatically decrease the combinatorics of matching and define conditions for discarding wrong putative correspondences. This considerably accelerates the search process while improving overall accuracy and robustness of registration. More specifically, the state-of-the-art in 3D registration is advanced in many ways.

In an embodiment, there is a robust and efficient method for performing the registration of curve-vs-surface in arbitrary initial positions (FIG. 1B(d)) that can totally or partially overlap, which is a largely unsolved problem of practical significance in CAOS (FIG. 1C, FIG. 4). It is shown that the rigid transformation for correct alignment can be determined from a single correspondence of a 2-tuple (or pair) of points+tangents in the curve side, with a 2-tuple (or pair) of points+normals in the surface side. The method establishes criteria for matching 2-tuples point+vector between curve and surface, such that the search problem becomes tractable and the estimation can be efficiently carried using a hypothesize-and-test strategy.

In an embodiment, there is a robust and efficient method for performing the registration of curve-vs-curve in arbitrary initial positions (FIG. 1B(f)) that can totally or partially overlap, which is another largely unsolved problem with potential applications in CAOS and other domains. The method consists in a straightforward extension of the approach used for curve-vs-surface alignment where 2-tuples of points+tangents are considered in both sides or models.

In an embodiment, there is a method for performing the registration of surface-vs-surface in arbitrary initial positions (FIG. 1B(b)) that can totally or partially overlap, which is an alternative to the 4PCS family of algorithms with advantages in terms of accuracy, computational efficiency, and required overlap. The new method consists in a straightforward adaptation of the approach used for curve-vs-surface alignment where 2-tuples of points+normal are considered in both sides or models.

In an embodiment, there is a method for the registration of points-vs-surface in arbitrary initial positions (FIG. 1B(e)) that benefits from the use of differential information (normals) by dramatically decreasing the combinatorics of the search problem.

Please note that the surfaces and curves mentioned above can either be described parametrically by suitable mathematic equations, or be sets of 3D points with different spatial density and connectivity, in which case surfaces are dense 2D connected sets of points and curves are 1D connected sets of points. In a similar manner, the normal and tangent vectors can either be computed exactly using differential calculus or be approximated using any discrete numerical method known in the art. The disclosed embodiments are also independent of the way the different models (surfaces, curves and points) are obtained. Surfaces can be acquired from Computer Tomography (CT-scan), Magnetic Resonance Imaging (MRI), passive stereo or multi-view reconstruction from video images, or using time-of-flight or structured-light devices such as ultra-sound, laser range finders or RGB-D sensors. Curves can be reconstructed using a tracked touch-probe for which the tracking can be visual, optical, electromagnetic or through a servo-mechanism with encoders; a video camera, in which case the 3D modeling is accomplished using passive multi-view reconstruction algorithms; a time-of-flight sensor or device, which includes but is not limited to ultrasound and laser range finder systems; or a RGB-D camera, which employs structured light to obtain the depth image. 3D points can be obtained from successive images or frames acquired by a calibrated camera that moves with respect to the object or environment with a known motion, in which case points are matched or tracked across frames, reconstructed through triangulation and the changes or deformation in the image patches around those points across successive frames allow the normals at those points to be estimated.

The problem of points-vs-points alignment (FIG. 1B(a)) can be easily solved whenever correspondences are known. Recent works have addressed the situation of unknown point correspondences, but the available methods still lack robustness and/or are computationally expensive.

Surface-vs-surface alignment, which consists in registering two partially-overlapping dense meshes or point clouds, is the variant of registration that deserves the most attention in the art (FIG. 1B(b)). The most well-established algorithm is the classical Iterative Closest Point (ICP) that iteratively performs the following steps until convergence: find the point in the target surface that is closest to each point in the source model, estimate the rigid transformation between the models using the obtain matches and transform the source model. Although it has proven to be an effective method for fine alignment, it is not adequate for global registration and requires a proper initial guess for the relative transformation. Thus, effort has been devoted in performing the initial alignment in a fast, robust manner. Some results of this effort include feature based approaches and global optimization schemes. Unfortunately, and since 3D models are often smooth and/or noisy, it is difficult to detect repeatable landmark points that can be matched in a non-ambiguous manner. Thus, these methods typically require large overlap between surfaces, which may not happen because of occlusions and/or acquisition from very different viewpoints. In order to avoid the requirements of good initialization and large overlap, a new class of methods has been proposed: the so-called 4-Point Congruent Sets (4PCS) approaches that rely in sets of 4 coplanar points which define affine invariants that are preserved under rigid displacement. 4PCS uses an hypothesize-and-test scheme that repeats the steps of rigid transformation hypothesis generation and evaluation of the quality of the hypothesis until convergence. The method selects a random base of 4 coplanar points in the source 3D model and finds all the 4-point sets in the target model that are approximately congruent with the base, i.e. related by a rigid transformation. For each potential 4-point set, the aligning transformation is computed and the best one according to some metric is retained. The search for congruent bases has been proposed and is done with a time complexity of $O(N+M+K)$. The first stage is to extract pairs of points with predefined distances in the target model, which is done in $O(N)$, N being the number of points. Since the set of 4-point bases obtained from the M extracted pairs may contain non-rigid invariant 4-point candidates, a search for the congruent ones is performed with a complexity of $O(M+K)$, where K is the number of reported sets. Despite enabling to perform the search in linear time, which is a significant improvement when compared to previous methods, this approach is not suitable for performing curve-vs-surface alignment due to the very small overlap between the 3D models, which increases the search time. Moreover, when using curves, the constraint of coplanarity of the points in the candidate sets may be difficult to satisfy. A more recent approach removes the coplanarity condition and considers general 4-point sets. Although it leads to speed-ups of up to 6.5× when compared to other methods, the method is still not able to handle the situation of very small overlap that occurs in curve-vs-surface alignments. The methods herein disclosed, not only solve the problems of curve-vs-surface and curve-vs-curve alignment that are not tackled by 4PCS, but also enable to perform surface-vs-surface alignment with comparative gains in terms of computational complexity and final accuracy.

Another variant of 3D registration that has also deserved attention is the points-vs-surface alignment (FIG. 1B(e)). In this case, most methods work in the context of obtaining a suitable initialization to be refined by ICP, where landmark points are extracted, and the problem becomes a points-vs-points problem (FIG. 1B(a)).

1. 3D registration of curve-vs-surface (FIG. 1B(d)).

In an embodiment, there is a global 3D registration method for the curve-vs-surface situation that aligns a 3D model M of a generic object or environment consisting of a curve, or set of curves, C with a model M' of the same object or environment which is a surface, or set of surfaces, S in arbitrary initial positions. It is shown that the rigid transformation can be computed from two pairs of corresponding points plus the first order derivatives at those points. In an embodiment, a method of this disclosure may compute the normals in the surface and the tangents in the curve and searches for corresponding pairs of points using the differential information to decide if they are a plausible match. The simultaneous use of points and tangents/normals may dramatically reduce the combinatorics of the search problem when compared to a naive approach that would search for triplets of points, or the new family of algorithms 4PCS that searches for sets of 4 points. The pair of points with the corresponding tangents/normals may be referred to as a 2-tuple point+vector and all the tangents and normals in the mathematical derivations are assumed to be unitary.

1.1 Closed-Form Solution for Curve-Vs-Surface Registration

Let $\{P, Q, p, q\}$ and $\{P', Q', p', q'\}$ be two corresponding 2-tuples point+vector in curve C and surface S, respectively, and R, t the rigid displacement that aligns C with S, as illustrated in FIG. 2A. Rotation R can be determined independently of translation t as a succession of two rotations: $R_1$ that aligns vectors $d=Q-P$ and $d'=Q'-P'$, and $R_2$ that places tangents p, q in the planes defined by normals p', q', respectively. This can be written as $$R=R_2 R_1,$$

where rotation $R_1$ is represented in angle-axis format by $$R_1 = e^{[\omega] \times \alpha},$$

with $\omega$ being the normal to the plane defined by vectors d and d', as illustrated in FIG. 2B(a), and $\alpha$ being given by $\alpha = \cos^{-1}(\lambda^{-2} d^T d')$, with $\lambda = \|d\| = \|d'\|$.

Having vectors d and d' aligned using rotation $R_1$, a second rotation $R_2$ around d' by an angle $\beta$ (FIG. 2B(b)) may be performed in order to make vectors $R_1 p$ and $R_1 q$ orthogonal to q and q' i.e., $R_2$ must satisfy the following conditions:

$$p^T R_2 R_1 p = 0$$

$$q'^T R_2 R_1 q = 0.$$

Using Rodrigues' formula, $R_2$ can be written as $$R_2 D + (I-D)\cos\beta + \lambda^{-1}[d']_\times \sin\beta,$$

where I is the 3×3 identity matrix and $D = \lambda^{-2} d' d'^T$.

Replacing $R_2$ in the above system of equations by the previous expression, it comes that $\beta$ can be determined by solving the following matrix equation:

$$M \begin{bmatrix} \cos\beta \\ \sin\beta \\ 1 \end{bmatrix} = \begin{bmatrix} 0 \\ 0 \end{bmatrix},$$

where M is given by $$M = \begin{bmatrix} p^T R_1^T (I-D) p' & -\lambda^{-1} p^T R_1^T [d']_\times p' & p^T R_1^T D p' \\ q^T R_1^T (I-D) q' & -\lambda^{-1} q^T R_1^T [d']_\times q' & q^T R_1^T D q' \end{bmatrix}.$$

It should be noted that matrix M may not be an arbitrary 2×3 matrix. Its structure may be such that the first two values of its right-side null space are consistent sine and cosine values. This idea will be further explored in Section 1.3.

Given rotation R, the translation can be determined in a straightforward manner using one of the point correspondences: $t = P' - RP$.

1.2 Translation- and Rotation-Invariant Descriptor of 2-Tuples Point+Vector

At this point, it is possible to compute R, t given matching 2-tuples between a curve and a surface. However, there is still the challenge of, given a 2-tuple in one side, finding potential correspondences on the other side. This section describes a compact description of a generic 2-tuple that will prove to be useful for carrying this search.

Let P, Q be two points and p, q be the corresponding vectors that can either be tangents, in case P, Q belong to a curve, or normals, in case P, Q lie on a surface.

Consider a local reference frame with origin in P, with the z axis aligned with $d = Q - P$, and with the y axis oriented such that it is coplanar with vector p and points in the positive direction. This arrangement is depicted in FIG. 2C(a), where $z = d/\|d\|$, $x = (p \times z)/\|(p \times z)\|$ and $y = (z \times x)/\|(z \times x)\|$.

The local cartesian coordinates can now be replaced by spherical coordinates which are particularly convenient to represent vectors. Choosing these coordinates such that the azimuth of vector p is zero, it comes that the mapping from cartesian (x, y, z) to spherical ($\rho$, $\theta$, $\Phi$) coordinates is $$\rho = \sqrt{x^2 + y^2 + z^2}$$

$$\theta = \tan^{-1} -\frac{x}{y}$$

$$\phi = \tan^{-1} \frac{z}{\sqrt{x^2 + y^2}},$$

where $\Phi \in [-\pi/2, \pi/2]$ and $\theta \in \,]-\pi, \pi]$.

The cartesian coordinates of vectors d, p and q in the local reference frame, expressed in terms of azimuth $\theta$ and elevation $\Phi$ are $$d = \begin{bmatrix} 0 \\ 0 \\ \lambda \end{bmatrix}, p = \begin{bmatrix} 0 \\ \cos\phi_p \\ \sin\phi_p \end{bmatrix}, q = \begin{bmatrix} -\sin\theta_q \cos\phi_q \\ \cos\theta_q \cos\phi_q \\ \sin\phi_q \end{bmatrix},$$

with $\lambda = \|d\|$.

This equation emphasizes an important fact that is that an appropriate choice of local frame allows to uniquely describe a 2-tuple point+vector up to translation and rotation using only 4 parameters, which are used to construct vector F (FIG. 2C(b)):

$$\Gamma = [\lambda, \phi_p, \phi_q, \theta_q]^T.$$

Further mathematical manipulation enables to directly move from a 2-tuple P, Q, p, q to its descriptor $\Gamma$ by applying the following vector formulas $$\lambda = \|d\|$$

$$\phi_p = \frac{\pi}{2} - \cos^{-1}\left(\frac{p^T d}{\lambda}\right)$$

$$\phi_q = \frac{\pi}{2} - \cos^{-1}\left(\frac{q^T d}{\lambda}\right)$$

$$\theta_q = \text{sign}\left(p^T [d] \times q\right) \cos^{-1}\left(\frac{(q \times d)^T (p \times d)}{\|q \times d\| \|p \times d\|}\right),$$

where sign represents the signal function.

1.3 Conditions for a 2-Tuple in a Curve to Match a 2-Tuple in a Surface

Let $\{P, Q, p, q\}$ and $\{P', Q', p', q'\}$ be 2-tuples in curve C and surface S with descriptors $\Gamma$ and $\Gamma'$. If the 2-tuples are not a match, the matrix equation of Section 1.1 does not provide a solution with the desired format and rotation $R_2$ cannot be estimated. This section explores this fact to derive the conditions for the pair of 2-tuples $\Gamma$ and $\Gamma'$ to be a match by enforcing that the matrix equation has a consistent solution.

Let $\Gamma$" be defined by $\Gamma"=[\lambda', \phi_{p'}, \phi_{q'}, \theta_{p'}]^T$. The first condition for $\Gamma$ and $\Gamma$" to be a match is that $\lambda=\lambda'$. Another condition is that there exists a rotation $R_2$ that simultaneously makes p, q be orthogonal to p', q'. Since we are considering local reference frames for description such that d and d' are coincident and aligned with a common z axis, the system of equations 3 becomes $$\begin{matrix} p'^T R_2 p = 0 \\ q'^T R_2 q = 0 \end{matrix}, \text{ with } R_2 = \begin{bmatrix} \cos\beta & \sin\beta & 0 \\ -\sin\beta & \cos\beta & 0 \\ 0 & 0 & 1 \end{bmatrix}.$$

Writing p, q and p', q', in terms of the description parameters of $\Gamma$ and $\Gamma$" and replacing in Equation 10, yields $$\cos\beta = -\tan\phi_p \tan\phi_{p'}$$

$$\cos(\beta+\theta_q-\theta_{q'}) = -\tan\phi_q \tan\phi_{q'}.$$

Since the cosine varies between −1 and 1, the following must hold to enable the existence of an angle β:

$$-1 \leq -\tan\phi_p \tan\phi_{p'} \leq 1$$

$$-1 \leq -\tan\phi_q \tan\phi_{q'} \leq 1.$$

Manipulating the previous equations on the elevation angles of descriptors $\Gamma$ and $\Gamma$" we obtain a set of inequalities that, together with the distance condition, are conditions for the pair of 2-tuples to be a match:

$$\lambda = \lambda'$$
$$|\phi_p| - \frac{\pi}{2} \leq \phi_{p'} \leq \frac{\pi}{2} - |\phi_p|$$
$$|\phi_q| - \frac{\pi}{2} \leq \phi_{q'} \leq \frac{\pi}{2} - |\phi_q|$$

A careful analysis of the inequalities shows that they are the conditions on the elevation angles for making the cone defined by rotating vector p (or q) to intersect the plane defined by p' (or q'). This is illustrated in FIG. 2D where the two possible situations of non-existence (FIG. 2D(a)) or existence (FIG. 2D(b)) of a valid rotation $R_2$ are represented. FIG. 2D also clarifies the fact that the orientation of tangents/normals is irrelevant since all the derivations are independent of such orientation.

The previous inequalities must be satisfied in order to exist a rotation $R_2$ such that p becomes orthogonal to p' and q to q' in separate. Further manipulation allows a condition on the azimuthal and elevation angles that makes the two pairs of vectors orthogonal in simultaneous to be obtained:

$$\left(\frac{\tan\phi_{p'}\tan\phi_p}{\sin\delta_\theta}\right)^2 - (\delta_\phi^2 - 2\cos(\delta_\theta)\delta_\phi + 1) = 1,$$

with $\delta_\theta = \theta_{p'} - \theta_{q'}$ and $\delta_\Phi = (\tan\Phi_{q'} \tan\Phi_q)/(\tan\Phi_{p'} \tan\Phi_p)$.

If this equation is satisfied, then the matrix equation of Section 1.1 has a solution with the desired form.

At this point, and given 2 corresponding 2-tuples, it is possible to determine the rigid transformation R, t. In addition, a novel way to describe each 2-tuple by a compact 4-parameter vector, with such description being invariant to translations and rotations is proposed, and the conditions on these parameters for a 2-tuple $\Gamma$ in curve C to be a potential match of a 2-tuple $\Gamma$" in surface S are derived. The current challenge is in quickly establishing the correspondences such that a fast alignment of the curve and the surface is obtained. The following subsections propose example solutions to this problem.

1.4 Online Search Scheme

In an embodiment, a proposed registration algorithm performs the search for corresponding pairs of points in a RANSAC scheme, which is an hypothesize-and-test framework that iteratively selects a random set of points, generates an hypothesis and evaluates it according to some metric. In this particular application, it works by randomly extracting 2-tuples in model M and finding all the corresponding 2-tuples in model M' according to the conditions derived as explained previously. For each matching pair, the rigid transformation (rotation and translation) is estimated as explained herein and the number of inliers is computed. This is done by finding the point in model M' that is closest to each of the transformed points in model M and selecting the ones whose distance lies below a pre-defined threshold. The transformation that yields the largest number of inliers is considered as the initialization of the relative pose, to be further refined by ICP. As an alternative, the selection of inliers can also be performed by measuring the angle between the vectors (tangents or normals) of corresponding points, or by using a combination of both measurements.

The sequence of steps of each RANSAC iteration is depicted in FIG. 2E. The first one is to select (e.g., randomly) a 2-tuple from model M (step 100) and compute its descriptor $\Gamma$ (step 102). Then, all the pairs at distance λ in model M' are extracted in O(N) time (step 104), N being the number of points in the surface, by organizing the model in a 3D grid, subdividing it recursively and intersecting it with spheres of radius λ centered in each point. The centers and the points of intersection, along with the corresponding vectors, yield a set of 2-tuples that may be subsequently pruned by keeping only the ones that satisfy the conditions for a pair of 2-tuples to be a match (step 106). This step takes O(K) time, where K is the number of extracted pairs. For all K pairs, a rigid transformation is then computed (step 108) and the one that yields the largest number of inliers is retained.

The fact that the complexities of both the pair extraction and the filtering stages are linear and the number of points and extracted pairs is typically high may make this search scheme unsuitable for fast operation in real cases, where both the surface and the curve may contain thousands of points. This issue motivated the search scheme described below that makes use of the fact that the surface is known a priori (it is the pre-operative 3D image of the patient's anatomy).

1.5 Offline Search Scheme for Medical Applications

There are several medical procedures in which there is a pre-operative 3D model that can be processed before the actual surgery is performed. Using this prior information allows to significantly speed up the search for corresponding pairs of points when compared to the online scheme proposed in the previous section.

1.5.1 Offline Processing of the Surface

A typical CAOS procedure has an offline stage for obtaining a 3D model M' of the targeted bone that occurs before the actual surgery is performed. Knowing this, an offline stage for processing the bone model (surface) is proposed, whose output is used in the online correspondence search scheme, allowing a very fast operation. The sequence of steps of this stage is shown in FIG. 2F(a). The advantage of performing an offline processing of the data is that most of the computational effort of the algorithm is transferred from the online stage to the pre-processing, where computational time is irrelevant.

The offline stage includes building a data structure that contains the relevant information for all pairs of points of the model in order to facilitate and accelerate the online search stage. Firstly, all 2-combinations of points are extracted (step 110) and their 4-parameter vectors Γ' are computed (step 112). The corresponding switched point-wise correspondences have descriptors $\Gamma^*=[\lambda', -\phi_p', -\phi_q', \theta_p']^T$, and descriptors Γ' and Γ* are organized in a data structure that is stored in memory and is suitable for fast search (step 114), such as an R-tree.

1.5.2 Online Search Scheme

A proposed online search scheme (FIG. 2F(b)) starts by selecting a 2-tuple point+vector from model M (step 116) and computing its descriptor Γ (step 118). This selection can be performed randomly or, in alternative, by using prior information. As an example, knowing the dimension of model M' allows to only select 2-tuples for which λ is higher than some value that depends on that dimension, which is advantageous since using wider 2-tuples leads to a smaller number of matches, making the search faster and the algorithm more robust against noise. The selected 2-tuple is then used for querying the data structure that is stored in memory for finding matches Γ$_i$' (step 120). The obtained correspondences of 2-tuples are then processed used for estimating a rigid transformation Ri, ti (step 122) and the one with the best score according to some function is considered (step 124). This sequence of steps is repeated until the algorithm converges, where the criteria of convergence may be the number of iterations or score function thresholding. A plausible score function is the quantification of the number of inliers, which can be computed as described in Section 1.4.

When compared to the search scheme described in Section 1.4, this method is advantageous since the time-consuming step of extracting pairs of points from the surface is performed in the offline stage. Also, the fact that it quickly finds plausible correspondences makes it very robust against outliers and small overlap between the two models M and M'.

2. 3D Registration in Case Model M is a Surface or Model M' is a Curve (FIG. 1B(b) and FIG. 1B(f))

This section shows how to solve the global 3D registration problem for the situations of model M being a surface, in which case the unitary vectors p, q are normals to the surface and the registration becomes surface-vs-surface, or model M' being a curve, in which case the unitary vectors p', q' are tangents to the curve and the registration becomes curve-vs-curve.

Similar to the case of curve-vs-surface registration, we solve the matching and alignment tasks using differential information (normals or tangents).

Consider two models M and M' of the same type and two corresponding 2-tuples point+vector, where vector is a normal in case M and M' are surfaces or a tangent in case M and M' are curves, with descriptors Γ and Γ'. The methods and derivations of Section 1 hold with two differences. First, the constraints for determining the angle β of rotation $R_2$ become $$p'=R_2R_1p$$

$$q'=R_2R_1q,$$

meaning that R, t can be computed in closed-form using two points and just one vector. This is valid because in this case $R_2$ is the rotation that aligns the corresponding vectors.

The second difference is that the conditions for a pair of 2-tuples to be a match become $$\lambda=\lambda'$$

$$\phi_p=\pm\phi_p'$$

$$\phi_q=\pm\phi_q'$$

$$\theta_q=\theta_q',$$

where the ±sign accounts for the fact that the normals and tangents are in general non-oriented. Instead of being inequalities, as in the curve-vs-surface alignment, in this case the conditions for matching are equalities. This is advantageous not only because the number of matching pairs is significantly smaller but also because it enables the search to be performed by finding the nearest neighbors using all equalities in simultaneous.

2.1 Search Process to Establish Matches

The two search processes based on hypothesize-and-test schemes described in Section 1, either employing an offline processing of model M' or not, can be used to solve the curve-vs-curve alignment problem. However, since typically the curves contain significantly fewer points than the surfaces, leading to a relatively small number of corresponding 2-tuples in this case, a new strategy may be used. The idea is to first employ some saliency criteria in the curves (e.g. by filtering out points without meaningful curvature) and then perform matching of pairs using their descriptors. These matches are used in a RANSAC scheme where the inliers are the corresponding 2-tuples that align according to some threshold, as opposed to the previous case where the closest points to all the points in the source model had to be found. Depending on the number of salient points, this may provide relevant improvements in the search time.

Since in the surface-vs-surface registration the cardinality of both models is in general dramatically higher than in the curve-vs-curve alignment, the idea of performing matching similarly to what is commonly done in 2D images cannot be applied. Thus, in this case, the search process to establish matches may be done using the hypothesize-and-test schemes proposed in Section 1, being advantageous to employ the offline processing of one of the surfaces if it is available before the registration is performed.

3. 3D Registration in Case Model M is a Sparse Set of 3D Points (FIG. 1B(e))

In case model M is a sparse set of 3D points, the alignment problem becomes points-vs-surface (FIG. 3), for which there exist several solutions in the art. The common approach is to perform feature extraction from the surface and establish 3D-3D correspondences using local descriptors. Unlike the existing methods, and similarly to the other algorithms disclosed in this document, we accomplish the points-vs-surface registration by making use of differential information. For this, model M is a sparse set of 3D points $P_i$ with the corresponding normals $p_i$, that can be obtained from successive images or frames acquired by a calibrated camera that moves with respect to the object or environment with a known motion Rc, tc. This allows points that are matched or tracked across frames to be reconstructed through triangulation, providing the 3D coordinates $P_i$. The normal $p_i$ at each 3D point $P_i$ can be inferred from the changes or deformation of the image patches around the corresponding matched/tracked points across successive frames. In more detail, recent work on affine transformations as shown that an affine correspondence (x, y, z), where (x, y) is the point correspondence and A is the 2×2 matrix that maps points in the neighborhood of x to points around y, induces a 2-parameter family of homographies. Thus, by employing standard processing techniques for extracting affine transformations in the locations of the matched/tracked points, it is possible to recover the homography up to 2 degrees of freedom. Knowing the camera motion, it is also possible to estimate normal $p_i$ at each point Pi by solving the following system of linear equations:

$$B[\gamma p_i \gamma g_3 g_6]^T = C,$$

with $\gamma$, $g_3$ and $g_6$ being unknown parameters, $$B^T = \begin{bmatrix} t_c^T & 0 & 0 & 0 & 0 & 0 & 0 \\ 0 & 0 & 0 & t_c^T & 0 & 0 & 0 \\ 0 & 0 & 0 & 0 & 0 & 0 & t_c^T \\ & & & R_c(:)^T & & & \\ -y^T & -1 & 0 & 0 & 0 & x_1 y^T & x_1 \\ 0 & 0 & 0 & -y^T & -1 & x_2 y^T & x_2 \end{bmatrix}$$

and $$C^T = \begin{bmatrix} A(:,1)^T & 0 & A(:,2)^T & 0 & (y - Ax)^T & 1 \end{bmatrix}$$

where T(:) denotes the vectorization of matrix T, T(: j) represents column j of matrix T and $x=(x_1, x_2)$.

4. Implementation Details

The disclosed algorithms can be executed in a computer system that comprises or is connected to a sub-system that enables gradual acquisition of a 3D model M of an object or environment in successive instants or periods for registering M with a 3D model M' of the same object or environment that has been previously stored in computer memory, as illustrated in FIG. 1C. An example system will be described with reference to FIG. 7. The alignment result can be assessed visually by observing the overlay of model M (the curve) with model M' (the surface) using virtual reality, or the overlay of model M' with model M using augmented reality. The registration method can be executed on-the-fly in parallel with the gradual acquisition and using as input the increasing amount of 3D information from successive instants or periods. In order to guide the registration process and/or control the gradual acquisition of model M, feedback on the progress of convergence of the registration is communicated on-the-fly to the user or sub-system. In FIG. 4, this progress is represented by an interactive bar that becomes larger and greener as the registration converges. This progress depends on the extension of model M, on the quality of the current registration result and on the variation of the registration result with time The described execution of the registration algorithm does not depend on the sub-system for the gradual acquisition of the 3D model M. It can be a tracked touch-probe for which the tracking can be visual, optical, electromagnetic or through a servo-mechanism with encoders; a video camera, in which case the 3D modeling is accomplished using passive multi-view reconstruction algorithms; a time-of-flight sensor or device, which includes but is not limited to ultrasound and laser range finder systems; or a RGB-D camera, which employs structured light to obtain the depth image In case both 3D models M and M' are stored in memory, the sub-system for the acquisition of model M does not exist and the disclosed registration method is executed in a batch, non-interactive manner until converging to a final solution R, t.

5. Application of 3D Registration of Curve-Vs-Surface and Curve-Vs-Curve in CAOS Systems for Computer-Aided Orthopedic Surgery (CAOS) aim in general to leverage surgeon skills, and in particular to provide meaningful 3D information in the OR to guide execution and support clinical decision. The so-called navigated personalized surgery typically involves two steps: an offline, pre-operative step where images of the targeted patient anatomy, such as XR, CT or MRI, are used for planning the procedure; and an online, intra-operative step in which the pre-operative 3D model or plan is overlaid with the actual patient anatomy in the OR for the purpose of navigation and guidance to guarantee that surgical execution is as planned.

In some embodiments, a surgical navigation system, referred to as Visual-Tracking Inside the Anatomic Cavity (VTIAC), is used. It allows for reconstruction of intra-operative 3D contours by attaching small, easily recognizable visual markers to the bone and tools, and for the use of a free-moving monocular camera to estimate their relative pose in 3D using planar homographies. The marker that is attached to the bone surface is the World Marker (WM) since it works as an absolute reference across time and space with all measurements being represented in its reference system. Since the WM is fixated to a rigid structure, the camera motion between views is recovered by estimating the position of the camera w.r.t. the WM at each time instant. Another small fiducial marker is attached to the touch probe (TM) and its pose in the camera's reference frame is determined. 3D contours thus can be obtained by scratching the anatomic surface with the touch probe and computing the relative pose between the TM and the WM. The VTIAC concept was originally designed for intra-operative navigation in arthroscopy, but it can also be employed in conventional open surgery.

The disclosed curve-vs-surface 3D registration method can be used in conjunction with a surgical navigation system like VTIAC for intra-operative guidance during personalized orthopedic surgery. In this application context the term surface refers to the pre-operative model or plan (e.g. annotated CT scan or MRI), and the term curve corresponds to the 3D contours reconstructed intra-operatively with VTIAC.

There are a variety of different applications of the proposed registration method, as well as possible variations, including but not limited to arthroscopic procedures and open surgery. It will be understood that these procedures are mere examples that do not limit in any way the potential medical applications of the presented registration methods. The disclosed methods can be employed, for example, in arthroscopy other than knee and hip arthroscopy, such as shoulder arthroscopy and small joint arthroscopy, in open orthopedic surgery other than knee arthroplasty, such as hip or shoulder arthroplasty, and in clinical domains other than orthopedics such as spine surgery and dentistry.

Although the illustrating examples consider VTIAC for intra-operative 3D reconstruction of input contours and guidance using the output registration results, the method for curve-vs-surface alignment can be employed in conjunction with any other surgical navigation system or framework such as systems based in conventional opto-tracking technology.

5.1 Registration in Hip Arthroscopy

Femuro-Acetabular Impingement (FAI) is a condition in which extra bone grows on the femoral head (cam), on the acetabulum (pincer) or on both (combined). This extra bone causes abnormal contact between the hip bones and requires surgical medical treatment.

Concerning the cam impingement, the surgical procedure consists in removing the cam to restore the spherical shape of the femoral head. This is done by first planning the location of the cam using a pre-operative CT-scan of the femur and then a mental image of this plan is used during the surgery. Since it is very likely that this procedure leads to errors, intra-operative navigation can be an important addition since the pre-operative plan can be used to guide the surgeon using augmented and/or virtual reality.

FIG. 5A shows an embodiment of how the proposed curve-vs-surface registration can be used to accomplish navigation during arthroscopic FAI treatment. Step 0 corresponds to the planning of cam resection that is performed before the actual surgery. Then, the WM is attached close to the cam region (since this is the area to be resected) and the bone surface is scratched using a tool instrumented with the TM. This results in a set of reconstructed 3D contours which are used as input to the curve-vs-surface registration method herein disclosed. The other input is the pre-operative CT scan which has been processed offline, as explained in Section 1.5. The accurate registration allows the visualization of the 3D model using virtual reality and its overlay with the bone using augmented reality. By also overlaying the pre-operative plan of the cam location and extension in the 3D model and the image, the surgeon is guided through the cam resection procedure.

Although the example is given for the cam region to be overlaid on the femoral head, an identical procedure can be used to guide the treatment of pincer impingement in the acetabulum. Also, if the pre-operative model is a set of easily identifiable curves, such as the cartilage line in the femoral head, the curve-vs-curve alignment proposed in Section 2 can be used to accomplish 3D registration between pre-operative plan and intra-operative data.

5.2 Registration in Knee Arthroscopy

Another common medical condition that is treated using arthroscopy is the Anterior Cruciate Ligament (ACL) tear. The procedure to repair the ACL and restore knee stability consists in substituting the torn ligament with a tissue graft that is pulled into the joint through a tunnel opened with a drill. The correct anatomical position and orientation of this tunnel is crucial for knee stability, and drilling an adequate bone tunnel is the most technically challenging part of the procedure. The primary ACL reconstruction procedure has a failure rate of 3-25% with patients having an unsatisfactory outcome due to, for instance, knee instability or post-operative complications. Thus, a significant number of patients require an ACL revision surgery to stabilize the knee and prevent further meniscal and articular cartilage injuries, while simultaneously maximizing the patient's function and activity level. The revision procedure typically requires a pre-operative step where a CT scan of the knee is used for assessing the bone tunnel placement and enlargement, in order to plan the placement of the new tunnel to be drilled. Due to the already existing bone tunnel, the ACL revision is a much more difficult and delicate procedure than the primary ACL reconstruction, and thus an intra-operative navigation system to guide the surgeon can dramatically decrease the execution risk and complexity.

This section demonstrates how the proposed curve-vs-surface registration scheme can be used in the development of the navigation system to guide the ACL revision surgery. FIG. 5B shows an embodiment of a workflow of the procedure. The surgeon starts by scratching the surface of the knee in the intercondiliar region for reconstructing 3D contours (FIG. 5B(1)). Using the pre-operative CT scan as input, a curve-vs-surface registration is performed, allowing to overlay the pre-operative model in the video using augmented reality or, in alternative, to use virtual reality to visualize in real-time the motion of surgical tools and instruments in the space of coordinates of the pre-operative 3D model or plan (FIG. 5B(2)).

Since the location of the old tunnel is known a prior from the CT scan, it can be represented both in the video stream and in the 3D virtual space of the model, allowing the surgeon to intra-operatively plan the placement of the new tunnel. Possibilities to help on this task include rendering a virtual lateral XR with the Bernard's grid superimposed to decide where to place the tunnel footprint with respect to anatomical studies in the art or primary tunnel (FIG. 5B(3)). Another alternative is to provide in real-time the distance and angle w.r.t. to the primary tunnel (FIG. 5B(4)). This information enables to decide about the 3D position of the new tunnel and the navigation system can then guide the drilling operation in real time (FIG. 5B(5)).

The method herein described can be applied in a similar manner to place the tibial tunnel that is also required in the ACL revision procedure. Moreover, and similarly to the previous case, an alternative registration can be performed with the curve-vs-curve method where, instead of randomly scratching the surface, the surgeon outlines the border of inter-condyle region and/or other well-known curves visible in the CT scan.

Other alternatives of use include the decision in advance of the position and orientation of the tunnels that are annotated in the pre-operative 3D plan. The plan is registered intra-operatively using the curve-vs-surface alignment method herein disclosed which enables to overlay the planned tunnels with the patient anatomy in the OR.

5.3 Patient Specific Instrumentation (PSI) for Arthroplasty of Knee, Hip and Shoulder Patient specific instrumentation (PSI) is a modern technique applied in total knee, hip, and shoulder arthroplasty with the aim to facilitate the placement of implants, and with benefits that include more accuracy and decrease in surgical time. Using a pre-operative CT scan of the joint, a planning is performed by designing guides that fit onto the surface of the bones to guide the surgical procedure, e.g. for defining the position, orientation and slope of the resections to be performed on the knee in the case of total knee arthroplasty (TKA). An intra-operative navigation system can use the curve-vs-surface registration disclosed herein to guide bone resection in the case of TKA, avoiding the need of using cutting guides that have to be constructed in a sterilisable material and take 3 to 4 weeks to be produced.

FIG. 5C shows an embodiment of a work flow of the navigation system. A WM is placed in an arbitrary position and, similarly to the previous cases, the surface is scratched with a touch probe instrumented with the TM for reconstructing 3D contours of the knee surface. These contours are registered with the pre-operative bone model, allowing its accurate superimposition with the actual bone. The planning of the resection that was performed prior to the medical procedure can now be shown using both virtual and augmented realities, providing the 3D location, orientation and slope of the cuts to be performed. This information can either be used to directly guide the saw during the resectioning, or to properly place the mechanical guide that will constrain the movement of the saw.

Although the PSI example given in this section is for TKA, it can be applied in a similar manner to the procedures of total hip replacement (e.g. for aligning the cup by overlaying a pre-operative model of the acetabulum with the patient's anatomy) and total shoulder replacement (e.g. for guiding the drilling of the glenoid). Moreover, if the pre-operative model is a set of characteristic curves (e.g. the blumensaat line and/or the cartilage border) the registration can be performed using the disclosed curve-vs-curve registration scheme.

6. Application of 3D Registration of Surface-Vs-Surface in Robotics and Computer Graphics The disclosed method for surface-vs-surface registration using 2-tuples of points+normal is an alternative to other methods such as the Super4PCS with advantages in terms of accuracy and computational time. This is illustrated in the exemplary embodiment of FIG. 6 that concerns the alignment of 5 input 3D scans obtained with Microsoft Kinect camera (RGB+D camera). The scans where acquired from substantially different viewpoints which means that the surfaces to be aligned are in arbitrary positions. The right side of the image shows the alignment results using the Super4PCS method and the surface-vs-surface registration method herein disclosed. It can be observed that the accuracy of alignment is substantially better with the presented method. Moreover, while Super4PCS took 57 s to reach the final alignment result, the disclosed method took only 11 s to converge in the same computer.

7. Computing System

FIG. 7 is a block diagram illustrating an example system for carrying out one or more steps, processes, or methods of this disclosure. The system 700 may include a registration system 702 that includes a memory 704 containing instructions and a processor 706 configured to execute the instructions to perform one or more of the steps, processes, and/or methods disclosed herein. The system 700 may further include a stored model 708, a model acquisition device 710, an output device 712, and a user input device 714.

As generally described herein, the registration system 702 may be configured to register a newly-acquired model (e.g., a 3D model) acquired with the model acquisition device to a previous 3D model, such as the stored model 708. The stored model 708 may be stored in the memory 704, may be otherwise stored by the registration system 702 (as shown in FIG. 7), or may be otherwise accessible to the registration system 702. The stored model 708 may be based on one or more of Computer Tomography (CT-scan) data, Magnetic Resonance Imaging (MRI) data, passive stereo or multi-view reconstruction from video images, time-of-flight data or structured-light device data such as ultra-sound, laser range finders or RGB-D sensors, tracked touch-probe data for which the tracking can be visual, optical, electromagnetic or through a servo-mechanism with encoders, video camera data. Similarly, the model acquisition device 710 may be or may include one or more of a Computer Tomography (CT) scanner, Magnetic Resonance Imaging (MRI) scanner, stereo camera(s), time-of-flight data or structured-light device such as ultra-sound, laser range finders or RGB-D sensors, or tracked touch-probe for which the tracking can be visual, optical, electromagnetic or through a servo-mechanism with encoders. Other suitable data collection devices and data types may also find use with the methods of the present disclosure.

The output device 712 may be or may include one or more of a display, speakers, and/or one or more additional audio-visual or tactile output devices through which the registration system 702 may provide information to a user regarding the progress or status of a registration process or operation. In response, the user may provide feedback through the user input device 714 to guide collection of the new model with the model acquisition device 710. Accordingly, the registration system 702 may be configured to instruct data collection by the model acquisition device 710 responsive to user input.

To enable the operations disclosed herein, the registration system 702 may be in electronic communication with the model acquisition device 710, the output device 712, and/or the user input device 714. In embodiments in which the stored model 708 is stored externally to the registration system 702, the registration system may also be in electronic communication with the source of the stored model 708.

8. Computing Device

FIG. 8 is a diagrammatic view of an illustrative computing system that includes a general purpose computing system environment 800, such as a desktop computer, workstation, laptop, smartphone, tablet, or any other such device having the ability to execute instructions, such as those stored within a non-transient, computer-readable medium. Furthermore, while described and illustrated in the context of a single computing system 800, those skilled in the art will also appreciate that the various tasks described hereinafter may be practiced in a distributed environment having multiple computing systems 800 linked via a local or wide-area network in which the executable instructions may be associated with and/or executed by one or more of multiple computing systems 800.

In its most basic configuration, computing system environment 800 typically includes at least one processing unit 802 and at least one memory 804, which may be linked via a bus 806. Depending on the exact configuration and type of computing system environment, memory 804 may be volatile (such as RAM 810), non-volatile (such as ROM 808, flash memory, etc.) or some combination of the two. Computing system environment 800 may have additional features and/or functionality. For example, computing system environment 800 may also include additional storage (removable and/or non-removable) including, but not limited to, magnetic or optical disks, tape drives and/or flash drives. Such additional memory devices may be made accessible to the computing system environment 800 by means of, for example, a hard disk drive interface 812, a magnetic disk drive interface 814, and/or an optical disk drive interface 816. As will be understood, these devices, which would be linked to the system bus 806, respectively, allow for reading from and writing to a hard disk 818, reading from or writing to a removable magnetic disk 820, and/or for reading from or writing to a removable optical disk 822, such as a CD/DVD ROM or other optical media. The drive interfaces and their associated computer-readable media allow for the nonvolatile storage of computer readable instructions, data structures, program modules and other data for the computing system environment 800. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 800.

A number of program modules may be stored in one or more of the memory/media devices. For example, a basic input/output system (BIOS) 824, containing the basic routines that help to transfer information between elements within the computing system environment 820, such as during start-up, may be stored in ROM 808. Similarly, RAM 810, hard drive 818, and/or peripheral memory devices may be used to store computer executable instructions comprising an operating system 826, one or more applications programs 828 (such as the search engine or search result ranking system disclosed herein), other program modules 830, and/or program data 832. Still further, computer-executable instructions may be downloaded to the computing environment 800 as needed, for example, via a network connection.

An end-user may enter commands and information into the computing system environment 800 through input devices such as a keyboard 834 and/or a pointing device 836. While not illustrated, other input devices may include a microphone, a joystick, a game pad, a scanner, etc. These and other input devices would typically be connected to the processing unit 802 by means of a peripheral interface 838 which, in turn, would be coupled to bus 806. Input devices may be directly or indirectly connected to processor 802 via interfaces such as, for example, a parallel port, game port, firewire, or a universal serial bus (USB). To view information from the computing system environment 800, a monitor 840 or other type of display device may also be connected to bus 816 via an interface, such as via video adapter 842. In addition to the monitor 840, the computing system environment 800 may also include other peripheral output devices, not shown, such as speakers and printers.

The computing system environment 800 may also utilize logical connections to one or more computing system environments. Communications between the computing system environment 800 and the remote computing system environment may be exchanged via a further processing device, such a network router 182, that is responsible for network routing. Communications with the network router 182 may be performed via a network interface component 844. Thus, within such a networked environment, e.g., the Internet, World Wide Web, LAN, or other like type of wired or wireless network, it will be appreciated that program modules depicted relative to the computing system environment 800, or portions thereof, may be stored in the memory storage device(s) of the computing system environment 800.

The computing environment 800, or portions thereof, may comprise one or more of the registration system 702, the model acquisition device 710, the output device 712, or the user input device 714, or portions thereof, in embodiments.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

The described embodiments are to be considered in all respects only as illustrative and not restrictive and the scope of the presently disclosed embodiments is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed devices and/or methods.

What is claimed is:

1. A method comprising:
outputting for presentation to a user an annotated video of a surgical site, the annotated video comprising information overlayed on video of the surgical site, wherein the outputting comprises:
identifying, in the video of the surgical site, a three-dimensional (3D) position of a point depicted in the video of the surgical site, wherein identifying the three-dimensional position of the point comprises applying passive reconstruction to one or more frames of the video of the surgical site;
overlaying information on the video of the surgical site to yield the annotated video, wherein overlaying the information on the video of the surgical site comprises aligning a 3D model of the surgical site on the video of the surgical site at a location based on the 3D position of the point determined by applying the passive reconstruction to the one or more frames of the video of the surgical site and/or based on one or more local differential characteristics of a surface including the point at the 3D position of the point; and
outputting the annotated video of the surgical site for presentation,
wherein the 3D model of the surgical site is a second 3D model of the surgical site, and wherein aligning the 3D model of the surgical site comprises aligning the second 3D model to a first 3D model by:
defining a plurality of first points and first vectors in the first 3D model, wherein the first points correspond to points on a surface in the first 3D model and the first vectors correspond to normals to the first points;
identifying at least one second point and second vector in the second 3D model, wherein the at least one second point corresponds to a point on a surface of the second 3D model and the second vector corresponds to a normal to the at least one second point; and
aligning the second vector in the second 3D model to one of the first vectors in the first 3D model.

2. The method of claim 1, further comprising:
capturing the video of the surgical site using a free-moving camera moving in or relative to the surgical site during the surgery.

3. The method of claim 1, wherein overlaying the information on the video at the location based on the 3D position of the point and/or based on the one or more local differential characteristics of the surface including the point comprises overlaying the information at a location determined using the first 3D model of the surgical site.

4. The method of claim 3, wherein:
the method further comprises generating the first 3D model based on analysis of video data of the surgical site; and
overlaying the information comprises aligning the second 3D model of the surgical site with the first 3D model of the surgical site.

5. The method of claim 4, wherein the second 3D model of the surgical site is a pre-operative model of anatomy of the surgical site.

6. The method of claim 5, wherein the pre-operative model comprises a pre-operative plan of surgery to be performed at the surgical site.

7. The method of claim 4, wherein:
generating the first 3D model based on the analysis of the video data comprises determining from the analysis of the video data a set of 3D points, surfaces, and/or curves for anatomy of the surgical site of the video; and
overlaying the information at the location determined using the first 3D model of the surgical site comprises overlaying the information at a location determined using the set of 3D points, surfaces, and/or curves.

8. The method of claim 7, wherein determining the set of 3D points, surfaces, and/or curves for the anatomy of the surgical site comprises:
capturing the video data of the surgical site using a video camera; and
applying at least one reconstruction algorithm to the video data to identify the set of 3D points, surfaces, and/or curves.

9. The method of claim 8, wherein:
the video data comprises the one or more frames of the video of the surgical site; and
identifying the 3D position of the point depicted in the video comprises the generating the first 3D model of the surgical site.

10. The method of claim 8, wherein:
capturing the video data comprises capturing video data using stereo cameras; and
generating the first 3D model comprises analyzing the video data captured using the stereo cameras.

11. The method of claim 3, further comprising:
capturing sensor data of the surgical site using a time-of-flight sensor; and
generating the first 3D model based on analysis of sensor data of the surgical site.

12. The method of claim 11, wherein capturing the sensor data using the time-of-flight sensor comprises capturing the sensor data using an ultrasound system and/or a laser range finder system.

13. The method of claim 3, further comprising:
capturing touch probe data of the surgical site at least in part by tracking a touch probe; and
generating the first 3D model based on analysis of touch probe data of the surgical site.

14. The method of claim 13, wherein the tracking of the touch probe comprises at least one of visual tracking, optical tracking, electromagnetic tracking or tracking through a servo-mechanism with encoders.

15. The method of claim 13, wherein:
the touch probe comprises a fiducial marker attached thereto; and
tracking of the touch probe comprises tracking the fiducial marker of the touch probe.

16. The method of claim 3, further comprising:
capturing a depth image of the surgical site using an RGB-D camera to capture structural light; and
generating the first 3D model based on the depth image.

17. The method of claim 3, further comprising:
capturing sensor data of the surgical site using a structured light sensor; and
generating the first 3D model based on analysis of sensor data of the surgical site.

18. The method of claim 1, wherein overlaying the information on the video comprises overlaying information regarding a surgical plan.

19. The method of claim 18, wherein overlaying information regarding the surgical plan comprises annotating anatomy of the surgical site with the information regarding the surgical plan.

20. A system for outputting for presentation to a user an annotated video of a surgical site, the system comprising:
at least one processor; and
at least one storage medium having encoded thereon executable instructions that, when executed by the at least one processor, cause the at least one processor to carry out a method comprising:
outputting for presentation to a user an annotated video of a surgical site, the annotated video comprising information overlayed on video of the surgical site, wherein the outputting comprises:
identifying, in the video of the surgical site, a three-dimensional (3D) position of a point depicted in the video of the surgical site, wherein identifying the three-dimensional position of the point comprises applying passive reconstruction to one or more frames of the video of the surgical site;
overlaying information on the video of the surgical site to yield the annotated video, wherein overlaying the information on the video of the surgical site comprises aligning a 3D model of the surgical site on the video of the surgical site at a location based on the 3D position of the point determined by applying the passive reconstruction to the one or more frames of the video of the surgical site and/or based on one or more local differential characteristics of a surface including the point at the 3D position of the point; and
outputting the annotated video of the surgical site for presentation,
wherein the 3D model of the surgical site is a second 3D model of the surgical site, and wherein aligning the 3D model of the surgical site comprises aligning the second 3D model to a first 3D model by:
defining a plurality of first points and first vectors in the first 3D model, wherein the first points correspond to points on a surface in the first 3D model and the first vectors correspond to normals to the first points;
identifying at least one second point and second vector in the second 3D model, wherein the at least one second point corresponds to a point on a surface of the second 3D model and the second vector corresponds to a normal to the at least one second point; and
aligning the second vector in the second 3D model to one of the first vectors in the first 3D model.

21. At least one non-transitory computer-readable storage medium having encoded thereon executable instructions that, when executed by at least one processor, cause the at least one processor to carry out a method comprising:
    outputting for presentation to a user an annotated video of a three-dimensional (3D) object or surface of a surgical site, the annotated video comprising information overlayed on video of the 3D object or surface of the surgical site, wherein the outputting comprises:
        identifying, in the video of the 3D object or surface of the surgical site, a 3D position of a point depicted in the video of the 3D object or surface of the surgical site, wherein identifying the three-dimensional position of the point comprises applying passive reconstruction to one or more frames of the video;
        overlaying information on the video to yield the annotated video, wherein overlaying the information on the video comprises aligning a 3D model of the 3D object or surface of the surgical site at a location based on the 3D position of the point determined by applying the passive reconstruction to the one or more frames of the video and/or based on one or more local differential characteristics of a surface including the point at the 3D position of the point; and
    outputting the annotated video of the surgical site for presentation,
wherein the 3D model of the surgical site is a second 3D model of the surgical site, and wherein aligning the 3D model of the surgical site comprises aligning the second 3D model to a first 3D model by:
    defining a plurality of first points and first vectors in the first 3D model, wherein the first points correspond to points on a surface in the first 3D model and the first vectors correspond to normals to the first points;
    identifying at least one second point and second vector in the second 3D model, wherein the at least one second point corresponds to a point on a surface of the second 3D model and the second vector corresponds to a normal to the at least one second point; and
    aligning the second vector in the second 3D model to one of the first vectors in the first 3D model.

\* \* \* \* \*